US008141092B2

(12) United States Patent
Brown et al.

(10) Patent No.: US 8,141,092 B2
(45) Date of Patent: Mar. 20, 2012

(54) MANAGEMENT OF AN IOV ADAPTER THROUGH A VIRTUAL INTERMEDIARY IN A HYPERVISOR WITH FUNCTIONAL MANAGEMENT IN AN IOV MANAGEMENT PARTITION

(75) Inventors: Aaron C. Brown, Austin, TX (US); Douglas M. Freimuth, New York, NY (US); James A. Pafumi, Leander, TX (US); Renato J. Recio, Austin, TX (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1104 days.

(21) Appl. No.: 11/940,357

(22) Filed: Nov. 15, 2007

(65) Prior Publication Data

US 2009/0133028 A1 May 21, 2009

(51) Int. Cl.
*G06F 9/46* (2006.01)
(52) U.S. Cl. ........................................ 718/104; 718/1
(58) Field of Classification Search ..................... None
See application file for complete search history.

(56) References Cited

U.S. PATENT DOCUMENTS 6,247,080 B1 6/2001 Wallach et al.
6,842,857 B2 1/2005 Lee et al.
7,530,071 B2 5/2009 Billau et al.
7,613,847 B2 11/2009 Kjos et al.
7,694,047 B1 4/2010 Alston
2002/0152371 A1 10/2002 Lee et al.
2003/0005068 A1 1/2003 Nickel et al.
2003/0051021 A1 3/2003 Hirschfeld et al.
2004/0003063 A1* 1/2004 Ashok et al. ................ 709/221
2004/0158834 A1* 8/2004 Ham et al. ................... 718/104
2004/0181625 A1 9/2004 Armstrong et al.
2004/0210678 A1 10/2004 Pettey et al.
2005/0005062 A1 1/2005 Liu et al.
2005/0034027 A1* 2/2005 Hamilton et al. ............. 714/43
2005/0071363 A1* 3/2005 Chen et al. ................... 707/102
2005/0071446 A1* 3/2005 Graham et al. .............. 709/223
2005/0071514 A1* 3/2005 Anderson et al. ............... 710/1
2005/0114555 A1 5/2005 Errickson et al.
2005/0129040 A1 6/2005 Kiel et al.
2005/0149651 A1 7/2005 Doak et al.
2005/0182788 A1 8/2005 Arndt et al.
2005/0198641 A1 9/2005 Eilam et al.

(Continued)

OTHER PUBLICATIONS

Final Office Action mailed Jan. 5, 2011 for U.S. Appl. No. 12/346,251; 21 pages.

(Continued)

*Primary Examiner* — Emerson Puente
*Assistant Examiner* — Dong Kim
(74) *Attorney, Agent, or Firm* — Stephen J. Walder, Jr.; Matthew B. Talpis

(57) ABSTRACT

Mechanisms are provided for an I/O virtualization management partition (IMP) to control the shared functionality of an I/O virtualization (IOV) enabled I/O adapter (IDA) through a physical function (PF) of the IOA while the virtual functions (VFs) are assigned to client partitions for normal I/O operations directly. A hypervisor provides device-independent facilities to the code running in the IMP and client partitions. The IMP may include device specific code without the hypervisor needing to sacrifice its size, robustness, and upgradeability. The hypervisor provides the virtual intermediary functionally for the sharing and control of the IOA's control functions.

23 Claims, 13 Drawing Sheets

U.S. PATENT DOCUMENTS

| | | | | |
|---|---|---|---|---|
| 2005/0240932 | A1* | 10/2005 | Billau et al. | 718/104 |
| 2005/0246453 | A1 | 11/2005 | Erlingsson et al. | |
| 2005/0268047 | A1 | 12/2005 | Aslot et al. | |
| 2005/0268052 | A1 | 12/2005 | Hepkin et al. | |
| 2006/0085794 | A1 | 4/2006 | Yokoyama | |
| 2006/0123111 | A1* | 6/2006 | Dea et al. | 709/226 |
| 2006/0174087 | A1 | 8/2006 | Hashimoto et al. | |
| 2006/0195663 | A1 | 8/2006 | Arndt et al. | |
| 2006/0218322 | A1 | 9/2006 | Hoese et al. | |
| 2006/0218372 | A1* | 9/2006 | Ward | 711/173 |
| 2006/0221832 | A1 | 10/2006 | Muller et al. | |
| 2006/0236063 | A1 | 10/2006 | Hausauer et al. | |
| 2006/0239287 | A1 | 10/2006 | Johnsen et al. | |
| 2006/0242330 | A1 | 10/2006 | Torudbakken et al. | |
| 2006/0250945 | A1* | 11/2006 | Fernandes et al. | 370/216 |
| 2006/0281630 | A1* | 12/2006 | Bailey et al. | 502/200 |
| 2007/0011272 | A1 | 1/2007 | Bakke et al. | |
| 2007/0061441 | A1 | 3/2007 | Landis et al. | |
| 2007/0067366 | A1* | 3/2007 | Landis | 707/205 |
| 2007/0174850 | A1 | 7/2007 | Zur | |
| 2007/0192466 | A1 | 8/2007 | Nahum | |
| 2007/0192518 | A1 | 8/2007 | Rupanagunta et al. | |
| 2007/0244937 | A1 | 10/2007 | Flynn, Jr. et al. | |
| 2008/0091746 | A1 | 4/2008 | Hatasaki et al. | |
| 2008/0133709 | A1 | 6/2008 | Aloni et al. | |
| 2008/0155169 | A1 | 6/2008 | Hiltgen et al. | |
| 2009/0006710 | A1 | 1/2009 | Daniel et al. | |
| 2009/0113430 | A1 | 4/2009 | Riley | |
| 2009/0119087 | A1 | 5/2009 | Ang et al. | |
| 2009/0133016 | A1 | 5/2009 | Brown et al. | |
| 2009/0144731 | A1 | 6/2009 | Brown et al. | |
| 2009/0276773 | A1 | 11/2009 | Brown et al. | |
| 2010/0146170 | A1 | 6/2010 | Brown et al. | |
| 2010/0165874 | A1 | 7/2010 | Brown et al. | |

OTHER PUBLICATIONS

Office Action mailed Jan. 3, 2011 for U.S. Appl. No. 12/114,989; 26 pages.
Preliminary Amendment filed with the USPTO on Nov. 17, 2010 for U.S. Appl. No. 12/114,989, 33 pages.
U.S. Appl. No. 11/940,360, filed Nov. 15, 2007, Brown et al.
U.S. Appl. No. 12/114,989, filed May 5, 2008, Brown et al.
U.S. Appl. No. 11/949,419, filed Dec. 3, 2007, Brown et al.
USPTO U.S. Appl. No. 11/940,360, 2 pages.
USPTO U.S. Appl. No. 11/949,419, 1 page.
USPTO U.S. Appl. No. 12/114,989, 2 pages.
USPTO U.S. Appl. No. 12/330,578, 1 page.
USPTO U.S. Appl. No. 12/346,251, 1 page.
Office Action from China Patent Office dated Apr. 29, 2010 for Application No. 200810176301.4, 7 pages.
Final Office Action mailed Aug. 24, 2010 for U.S. Appl. No. 12/114,989; 34 pages.
Office Action mailed Aug. 16, 2010 for U.S. Appl. No. 12/346,251; 27 pages.
Response to Office Action filed with the USPTO on Nov. 5, 2010 for U.S. Appl. No. 12/346,251, 17 pages.
Brown, Aaron C. et al., “Differentiating Blade Destination and Traffic Types in a Multi-Root PCIe Environment”, U.S. Appl. No. 12/346,251, filed Dec. 30, 2008.
Brown, Aaron et al., “Differentiating Traffic Types in a Multi-Root PCI Express Environment”, U.S. Appl. No. 12/330,578, filed Dec. 9, 2008.
Notice of Allowance mailed on Sep. 15, 2011 for U.S. Appl. No. 12/346,251; 16 pages.
Office Action mailed Jul. 15, 2011 for U.S. Appl. No. 12/114,989; 26 pages.
Response to Office Action filed with the USPTO on Aug. 31, 2011 for U.S. Appl. No. 11/940,360, 36 pages.
Response to Office Action filed with the USPTO on Sep. 21, 2011 for U.S. Appl. No. 11/949,419, 31 pages.
Appeal Brief filed with the USPTO on May 18, 2011 for U.S. Appl. No. 12/346,251, 29 pages.
Interview Summary mailed Apr. 18, 2011 for U.S. Appl. No. 12/114,989; 3 pages.
Office Action mailed Jun. 2, 2011 for U.S. Appl. No. 11/940,360; 50 pages.
Office Action mailed Jun. 21, 2011 for U.S. Appl. No. 11/949,419; 49 pages.
Response to Office Action filed with the USPTO on Apr. 4, 2011 for U.S. Appl. No. 12/114,989, 37 pages.
Interview Summary mailed Oct. 28, 2011 for U.S. Appl. No. 12/114,989, 3 pages.
Notice of Allowance mailed on Nov. 28, 2011 for U.S. Appl. No. 11/940,360; 12 pages.
Notice of Allowance mailed on Dec. 6, 2011 for U.S. Appl. No. 11/949,419; 22 pages.
Response to Office Action filed with the USPTO on Oct. 14, 2011 for U.S. Appl. No. 12/114,989, 12 pages.

* cited by examiner

700

| | CALL | USED BY CLIENT LPAR FOR VFs? | USED BY IMP LPAR? |
|---|---|---|---|
| 702 | READ/WRITE I/O CONFIGURATION SPACE | YES | YES |
| 704 | RESET PF (AND ALL VFs ASSOCIATED WITH PF) | NO | YES |
| 706 | DISABLE VF | NO | YES |
| 708 | RESET VF | YES | NO |
| 710 | QUERY PF AND VF ERROR STATE | YES | YES |
| 712 | ENABLE PF AND VF FOR LOAD AND STORE OPERATIONS | YES | YES |
| 714 | QUERY I/O FABRIC ERROR INFORMATION | YES | YES |
| 716 | QUERY INTERRUPT SOURCE | YES | YES |
| 718 | SETUP DMA TRANSLATION | YES | NO |
| 720 | ADD/REMOVE VF FROM LPAR USE | YES | NO |
| 722 | ADD/REMOVE PF FROM LPAR USE | NO | YES |

| | HMC REQUEST | TARGET OF REQUEST | RESPONSE |
|---|---|---|---|
| 802 | QUERY I/O FABRIC CONFIGURATION | HYPERVISOR | HYPERVISOR RETURNS INFORMATION ABOUT I/O THAT EXISTS AND CHARACTERISTICS OF THAT I/O (FOR EXAMPLE, NUMBER OF POSSIBLE VFs FOR EACH PF) |
| 804 | SET INITIAL LPAR I/O CONFIGURATION | HYPERVISOR | HYPERVISOR ASSIGNS PFs TO IMP LPARs AND VFs TO CLIENT LPARs, AS DIRECTED, AND PASSES THAT INFORMATION TO PFW PRIOR TO BOOTING THE OS FOR THAT LPAR |
| 806 | POWER UP/DOWN IOA | HYPERVISOR | HYPERVISOR TURNS ON OR OFF POWER TO AN ADAPTER, AS DIRECTED |
| 808 | DYNAMIC ADD OF PF/VF | HYPERVISOR | HYPERVISOR SETS UP RESOURCES (FOR EXAMPLE, ADDRESS SPACE AND INTERRUPTS) FOR RECEIVING LPAR, EXPECTS FIRMWARE CALL FROM LPAR TO ADD PF/VF |
| 810 | DYNAMIC ADD OF PF | IMP | IMP CALLS FIRMWARE TO ADD PF TO LPAR, ADDS PF TO FABRIC CONFIGURATION, INITIALIZES PF CONFIGURATION SPACE, LOADS PF DEVICE DRIVER, ENABLES PF's IOV |
| 812 | DYNAMIC ADD OF VF | CLIENT | CLIENT CALLS FIRMWARE TO ADD VF TO LPAR, ADDS VF TO OS's FABRIC CONFIGURATION, LOADS PF DEVICE DRIVER, INITIALIZES VF CONFIGURATION SPACE |
| 814 | DYNAMIC REMOVE OF PF/VF | HYPERVISOR | HYPERVISOR EXPECTS FIRMWARE CALL FROM LPAR(s) FOR PF/VF RESOURCES, AND WHEN THE CALL IS MADE, REMOVES THE RESOURCES FROM THE LPAR (FOR EXAMPLE, ADDRESS SPACE, INTERRUPTS) |
| 816 | DYNAMIC REMOVE OF VF | CLIENT | CLIENT STOPS USING VF, REQUESTS RESET OF VF, REMOVES DEVICE DRIVER FOR VF, REMOVES VF FROM ITS CONFIGURATION. CALLS FIRMWARE TO REMOVE VF FROM LPAR |
| 818 | DYNAMIC REMOVE OF PF | IMP | IMP STOPS USING PF, RESETS PF, REMOVES DEVICE DRIVER FOR PF, REMOVES PF FROM ITS CONFIGURATION, CALLS FIRMWARE TO REMOVE PF FROM LPAR |
| 820 | IOA SOUTH SIDE MANAGEMENT | IMP | IMP PASSES REQUEST TO PF DEVICE DRIVER TO CONTROL THE SOUTH SIDE MANAGEMENT FUNCTIONS OF THE IOA (e.g., SETTING A VF's NETWORK ADDRESS) |
| 822 | QUERY PREVIOUS COMMAND COMPLETION AND STATUS | ANY | FOR A POLLED TYPE HMC INTERFACE, TARGET RETURNS ANY DATA FROM THE PREVIOUS COMMAND AND THE STATUS OF THE COMPLETION |

*FIG. 8*

MANAGEMENT OF AN IOV ADAPTER THROUGH A VIRTUAL INTERMEDIARY IN A HYPERVISOR WITH FUNCTIONAL MANAGEMENT IN AN IOV MANAGEMENT PARTITION

BACKGROUND

1. Technical Field

The present invention relates generally to an improved data processing system and method. More specifically, the present invention is directed to a system and method for management of an input/output virtualization (IOV) adapter, such as a Peripheral Component Interconnect (PCI) IOV adapter, through a virtual intermediary in a hypervisor and through a management program in an IOV management partition.

2. Description of Related Art

Most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

FIG. 1 is an exemplary diagram illustrating a system incorporating a PCI Express (PCIe) fabric topology in accordance with the PCIe specification. As shown in FIG. 1, the system 100 is comprised of a host processor (CPU) 110 and memory 120 coupled to a root complex 130, which is in turn coupled to one or more of a PCIe endpoint 140 (the term "endpoint" is used in the PCIe specification to refer to PCIe enabled I/O adapters), a PCI express to PCI bridge 150, and one or more interconnect switches 160. The root complex 130 denotes the root of an I/O hierarchy that connects the CPU/memory to the I/O adapters. The root complex 130 includes a host bridge, zero or more root complex integrated endpoints, zero or more root complex event collectors, and one or more root ports. Each root port supports a separate I/O hierarchy. The I/O hierarchies may be comprised of a root complex 130, zero or more interconnect switches 160 and/or bridges 150 (which comprise a switch or PCIe fabric), and one or more endpoints, such as endpoints 140, 170 and 182-188. For more information regarding PCI and PCIe, reference is made to the PCI and PCIe specifications available from the peripheral component interconnect special interest group (PCI-SIG) website at www.pcisig.com.

In addition to the PCI and PCIe specifications, the PCI-SIG has also defined input/output virtualization (IOV) standards for defining how to design an I/O adapter (IOA) which can be shared by several logical partitions (LPARs). A LPAR is a division of a computer's processors, memory, and storage into multiple sets of resources so that each set of resources can be operated independently with its own operating system instance and applications. The number of logical partitions that can be created depends on the system's processor model and resources available. Typically, partitions are used for different purposes such as database operation, client/server operation, to separate test and production environments, or the like. Each partition can communicate with the other partitions as if the other partition is in a separate machine. In modern systems that support LPARs, some resources may be shared amongst the LPARs. As mentioned above, in the PCI and PCIe specification, one such resource that may be shared is the I/O adapter using I/O virtualization mechanisms.

While the PCI-SIG provides a standard for defining how to design an IOA which can be shared by several LPARs, this specification does not define how to connect the IOA into a host system. Moreover, the standard does not specify how to manage the shared functionality of an IOA utilizing I/O virtualization. This is because the PCI-SIG specification is concerned with setting standards for the operation of the PCIe fabric below the root complex. In other words, the PCI-SIG does not provide any definition of standards for the root complex and above because that is considered the domain of system houses. That is, each of an Intel platform, an IBM Power® platform, and a Sparc platform, for example, may have different system implementation requirements that are not set forth in the PCI-SIG standards.

SUMMARY

The illustrative embodiments provide a system and method for management of an input/output virtualization (IOV) adapter through a virtual intermediary in a hypervisor with functional management in an IOV management partition. The mechanisms of the illustrative embodiments address the situation where an input/output (I/O) fabric is shared by more than one logical partition (LPAR) and where each LPAR can potentially share with the other LPARs an I/O adapter (IOA). The illustrative embodiments define a mechanism for one LPAR, in an I/O virtualization management partition (IMP), to control the shared functionality of an I/O virtualization enabled IOA through a physical function (PF), while the virtual functions (VFs) are assigned to client partitions for normal I/O operations directly.

In particular, with the mechanisms of the illustrative embodiments, each LPAR is assigned its own separate address space to access a virtual function (VF) assigned to it, and to receive interrupts directly from the VF assigned to it, such that each LPAR's perception is that it has its own independent IOA for purposes of normal I/O operations. Each VF of an IOA, such as a PCI Express (PCIe) I/O Virtual (IOV) adapter, may be shared across multiple LPARs. The mechanisms of the illustrative embodiments provide facilities for management of the shared resources of the IOV adapter via a Physical Function (PF) of the IOV adapter by assignment of that PF to an I/O Virtualization Management Partition (IMP). In addition, the IMP acts as the interface to the PF for purposes of accessing common VF functionality (for example, the network addresses for the VFs for a network adapter), which will be referred to here as the adapter south-side management.

A hypervisor provides IOV independent facilities to the code running in the IMP. The IMP may include device specific code without the hypervisor needing to sacrifice its size, robustness, and upgradeability. The hypervisor provides the virtual intermediary functionality for the sharing and control of the IOV adapter's control functions. More specifically, the code running in the hypervisor acts as a virtual intermediary (VI) to the VFs for purposes of fully managing the VF error handling, VF reset, and configuration operations.

In one illustrative embodiment, a method for managing input/output (I/O) virtualization is provided. The method may comprise creating one or more client partitions in the data processing system, each client partition having an associated portion of resources of the data processing system and performing I/O virtualization management operations with one or more I/O endpoints associated with the data processing system. The I/O virtualization management operations may operate to configure at least one of a physical function or a virtual function of the one or more I/O endpoints. The method may further comprise controlling access of the I/O virtualization management operations to resources of the one or more I/O endpoints using a virtual intermediary separate from the I/O virtualization management partition (IMP). The virtual intermediary may prevent a client partition from accessing resources of the one or more I/O endpoints that are not assigned to that client partition.

The method may further comprise creating an I/O virtualization management partition (IMP) in the data processing system. The IMP may perform I/O virtualization management operations with one or more I/O endpoints associated with the data processing system to thereby manage at least one physical function of the one or more I/O endpoints. The one or more client partitions may not be permitted to perform I/O virtualization management operations on the at least one physical function.

Creating one or more client partitions and creating the IMP may be performed by the virtual intermediary. This virtual intermediary may be a hypervisor associated with the data processing system. The hypervisor may be provided with access to configuration spaces for physical functions and virtual functions in the one or more I/O endpoints. The IMP may be provided with access to only configuration spaces for physical functions assigned to the IMP and configuration spaces for virtual functions belonging to physical functions assigned to the IMP, in the one or more I/O endpoints. The hypervisor may permit access by a client partition to configuration spaces of virtual functions, in the one or more I/O endpoints, assigned to the client partition and may block access by the client partition to configuration spaces of virtual functions, in the one or more I/O endpoints, that are not assigned to the client partition.

The method may further comprise receiving an input from a hardware management console (HMC) directing performance of the I/O virtualization management operations. The input from the HMC may be a command to initiate a hot-plug operation for adding a new I/O endpoint to the data processing system. In such a case, performing the I/O virtualization management operations may comprise allocating resources to the one or more client partitions based on addition of the new I/O endpoint, configuring the IMP based on the addition of the new I/O endpoint, and dynamically adding at least one virtual function of the new I/O endpoint to at least one client partition in the one or more client partitions.

The input from the HMC may be a command to initiate a hot-plug operation for removing an existing I/O endpoint from the data processing system. In such a case, performing the I/O virtualization management operations may comprise identifying at least one client partition in the one or more client partitions having resources associated with a virtual function of the I/O endpoint to be removed and removing the virtual function and resources associated with the virtual function from use by the at least one client partition. Performing the I/O virtualization management operations may further comprise removing, from use by the IMP, a physical function and resources associated with the physical function and powering down the I/O endpoint to be removed.

The input from the HMC may be a command to dynamically reconfigure the data processing system. In such a case, performing the I/O virtualization management operations may comprise receiving a selection of a virtual function of an I/O endpoint to add to a selected client partition in the one or more client partitions, setting up resources for selected virtual function in the selected client partition, and loading a device driver for the selected virtual function in the selected client partition.

The input from the HMC may be a command to dynamically reconfigure the data processing system. In such a case, performing the I/O virtualization management operations may comprise receiving a selection of a virtual function of an I/O endpoint to remove from a selected client partition in the one or more client partitions, removing the selected virtual function from further use by the selected client partition, and removing resources for selected virtual function in the selected client partition.

The input from the HMC may be a command to change a network address associated with a selected virtual function of an I/O endpoint. In such a case, performing the I/O virtualization management operations may comprise identifying a physical function associated with the selected virtual function and sending a management request to the IMP. The management request may include address information for changing the network address of the selected virtual function. Performing the I/O virtualization management operations may further comprise changing the network address of the selected virtual function via a device driver associated with the physical function based on the address information in the management request.

Performing the I/O virtualization management operations may comprise receiving in the virtual intermediary, from a device driver in a client partition of the one or more client partitions, a query virtual function error state firmware call and providing error information to the device driver from the virtual intermediary identifying an error state of a virtual function of an I/O endpoint. Moreover, performing the I/O virtualization management operations may comprise logging, by the device driver, the error information received from the virtual intermediary, sending a reset virtual function request from the device driver to firmware of the data processing system to reset the virtual function having the error state, and configuring the virtual function after reset.

Performing the I/O virtualization management operations may comprise detecting, by the virtual intermediary, a client partition failure and determining if a client partition reboot operation is to be performed and, if the client partition is not to be rebooted, removing virtual function resources associated with a failed client partition from the one or more I/O endpoints and adding the removed virtual function resources to a free virtual function resource pool. Moreover, performing the I/O virtualization management operations may comprise, if the client partition is to be rebooted, reassigning, by the virtual intermediary, the virtual function resources to the failed client partition after reboot of the failed client partition.

Furthermore, performing the I/O virtualization management operations may comprise detecting a failure of the IMP and initiating, by the virtual intermediary, a reboot of the IMP. Performing the I/O virtualization management operations may further comprise stalling firmware calls by the one or more client partitions relating to virtual functions associated with physical functions assigned to the IMP until the reboot of the IMP is complete and discontinuing stalling of firmware calls by the one or more client partitions following completion of the reboot of the IMP.

In other illustrative embodiments, a computer program product comprising a computer recordable medium having a computer readable program recorded thereon is provided. The computer readable program, when executed on a computing device, causes the computing device to perform various ones, and combinations of, the operations outlined above with regard to the method illustrative embodiment.

In yet another illustrative embodiment, an apparatus is provided. The apparatus may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is an exemplary diagram illustrating a definition of a set of exemplary Logical Partition (LPAR) to platform firmware calls in accordance with one illustrative embodiment;

FIG. 8 is an exemplary diagram illustrating a definition of a set of exemplary Hardware Management Console (HMC) to platform requests and responses in accordance with one illustrative embodiment;

DETAILED DESCRIPTION OF THE ILLUSTRATIVE EMBODIMENTS

The illustrative embodiments provide mechanisms for management of an input/output virtualization (IOV) adapter through a virtual intermediary in a hypervisor and through a management program in an IOV management partition. Thus, in order to understand the mechanisms of the illustrative embodiments, it is important to first understand how I/O virtualization may be implemented in a system utilizing a hypervisor or other virtualization platform. It should be appreciated that while the illustrative embodiments will be described with regard to Peripheral Component Interconnect Express (PCIe) adapters or endpoints, the present invention is not limited to such. Rather, the mechanisms of the illustrative embodiments may be implemented in any I/O fabric that supports I/O virtualization within the I/O adapters. Moreover, it should be appreciated that while the illustrative embodiments will be described in terms of an implementation in which a hypervisor is utilized, the present invention is not limited to such. To the contrary, other types of virtualization platforms other than a hypervisor, whether implemented in software, hardware, or any combination of software and hardware, currently known or later developed, may be used without departing from the spirit and scope of the present invention.

Figure 2:
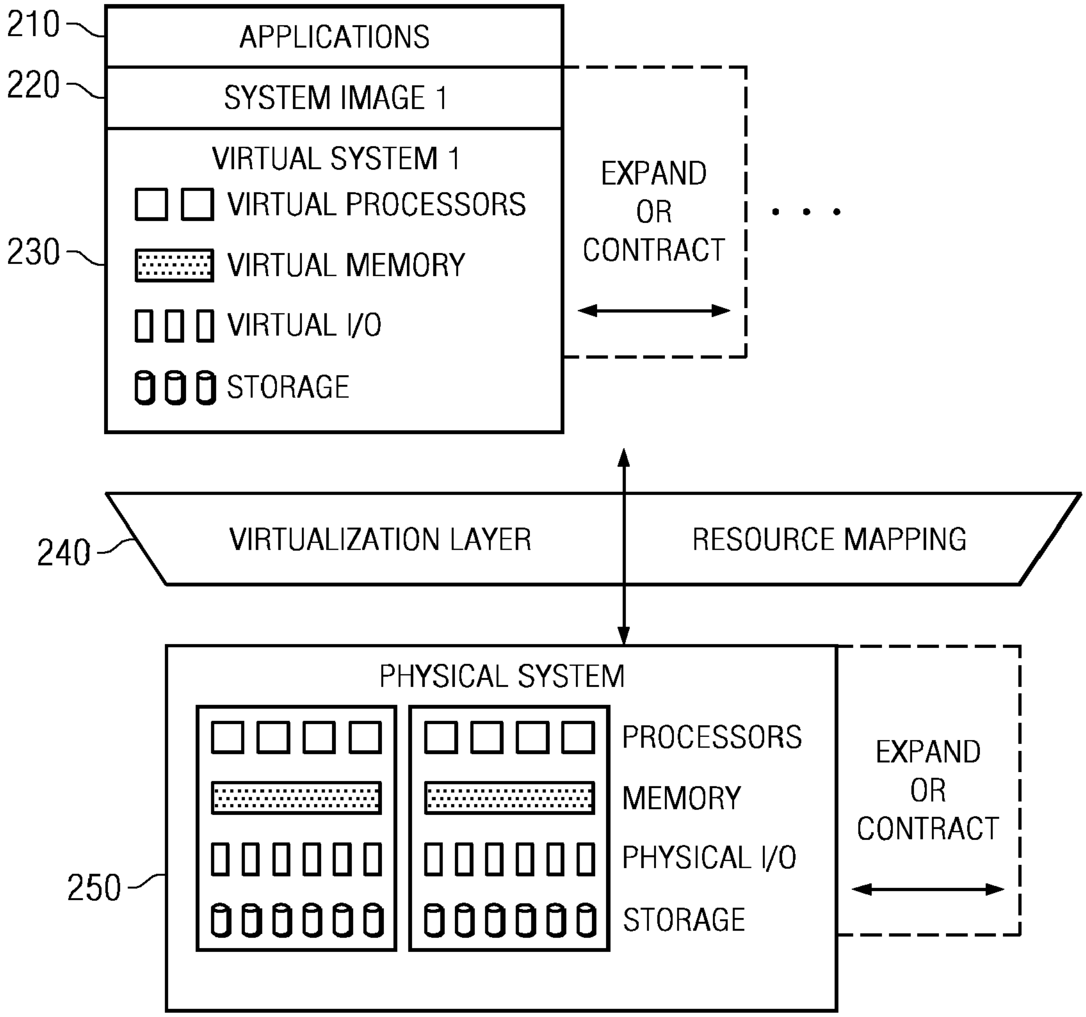
FIG. 2 is an exemplary diagram illustrating system virtualization as is generally known in the art.

FIG. 2 is an exemplary diagram illustrating system virtualization as is generally known in the art. System virtualization is the division of a physical system's processors, memory, I/O adapters, storage, and other resources where each set of resources operates independently with its own system image instance and applications. In such system virtualization, virtual resources are composed from physical resources and operate as proxies for physical resources, e.g., memory, disk drives, and other hardware components with architected interfaces/functions, having the same external interfaces and functions. System virtualization typically utilizes a virtualization layer which creates virtual resources and maps them to the physical resources thereby providing isolation between virtual resources. The virtualization layer is typically provided as one of, or a combination of, software, firmware, and hardware mechanisms.

As shown in FIG. 2, typically in a virtualized system, an application 210 communicates with a system image (SI) 220 which is a software component, such as a general or special purpose operating system, with which specific virtual and physical resources are assigned. The system image 220 is associated with a virtual system 230 which is comprised of the physical or virtualized resources necessary to run a single SI instance, e.g., virtualized processors, memory, I/O adapters, storage, etc.

The system image 220, via the use of the virtual system 230, accesses physical system resources 250 by way of the virtualization layer 240. The virtualization layer 240 manages the allocation of resources to a SI and isolates resources assigned to a SI from access by other SIs. This allocation and isolation is often performed based on a resource mapping performed by the virtualization layer 240 and one or more resource mapping data structures maintained by the virtualization layer 240.

Such virtualization may be used to allow virtualization of I/O operations and I/O resources. That is, with regard to I/O virtualization (IOV), a single physical I/O unit may be shared by more than one SI using the virtualization layer 240 which may be partially or wholly implemented as a hypervisor. The hypervisor may be software, firmware, or the like, that is used to support IOV by intervening on, for example, one or more of configuration, I/O, and memory operations from a SI, and direct memory access (DMA), completion, and interrupt operations to a SI.

Figure 3:
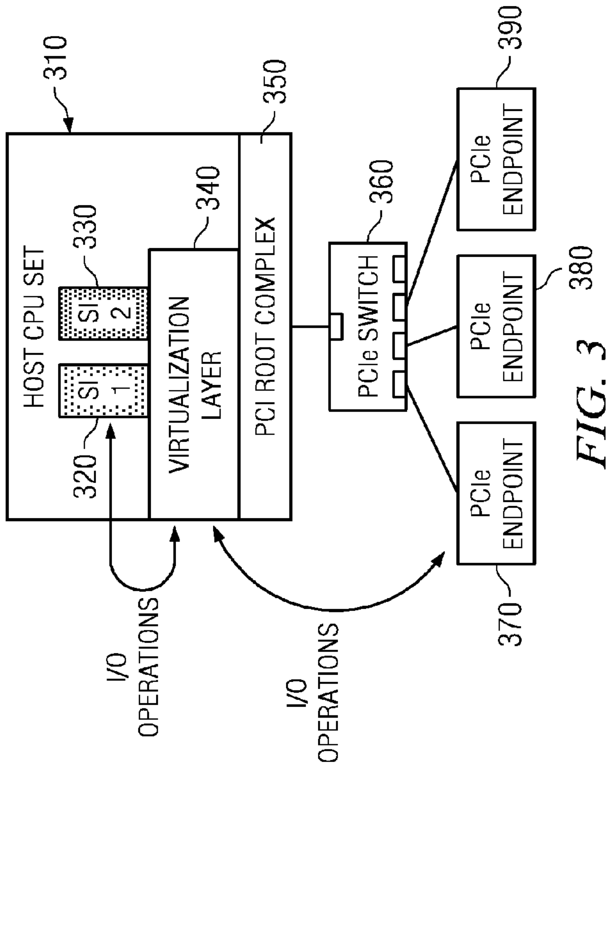
FIG. 3 is an exemplary diagram illustrating a first approach for virtualizing I/O of a PCI root complex using a virtualization layer.

FIG. 3 is an exemplary diagram illustrating a first approach to virtualizing I/O of a PCI root complex using a virtualization layer. As shown in FIG. 3, a host processor set 310, which may be one or more processors of a chip, motherboard, blade, or the like, may support a plurality of system images 320-330 through which applications (not shown) may access system resources, such as PCIe endpoints 370-390. The system images communicate with the virtualized resources via the virtualization layer 340, PCIe root complex 350, and one or more PCIe switches 360, and/or other PCIe fabric elements.

With the approach illustrated in FIG. 3, the virtualization layer 340, which may be implemented partially or wholly as a hypervisor or other type of virtualization platform, is involved in all I/O transactions and performs all I/O virtualization functions. For example, the virtualization layer 340 multiplexes I/O requests from the various SIs' I/O queues onto a single queue in the PCIe endpoints 370-390. Thus, the virtualization layer 340 acts as a proxy between the SIs 320-330 and the physical PCIe endpoints 370-390.

Figure 4:
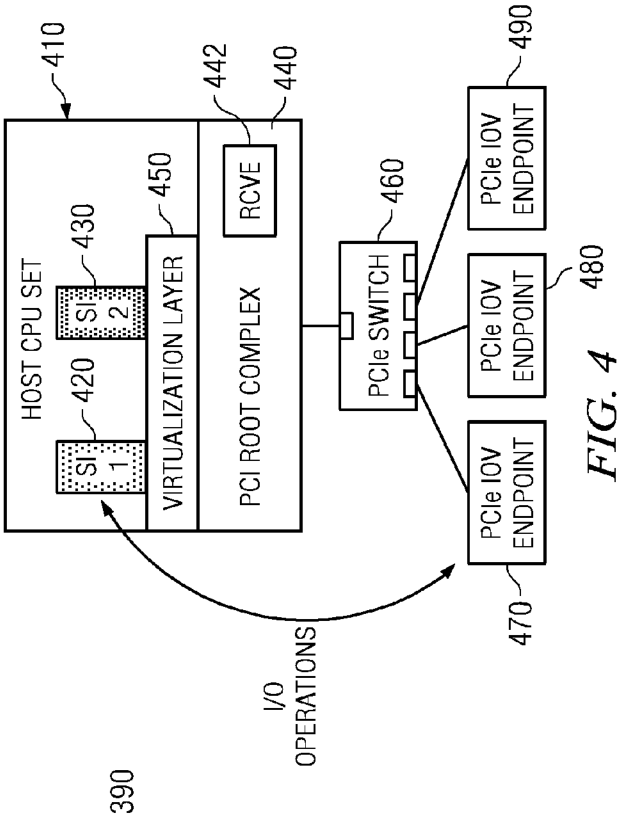
FIG. 4 is an exemplary diagram illustrating a second approach for virtualizing I/O of a PCI root complex using natively shared PCI I/O adapters.

FIG. 4 is an exemplary diagram illustrating a second approach to virtualizing I/O of a PCI root complex using natively shared PCI I/O adapters. As shown in FIG. 4, a host processor set 410, which may be one or more processors of a chip, motherboard, blade, or the like, may support a plurality of system images 420-430 through which applications (not shown) may access system resources, such as PCIe I/O virtualization (IOV) endpoints 470-490. The system images 420-430 communicate with the virtualized resources via the PCIe root complex 440 and one or more PCIe switches 460, and/or other PCIe fabric elements.

The PCIe root complex 440 includes root complex virtualization enablers (RCVE) 442 which may comprise one or more address translation and protection table data structures, interrupt table data structures, and the like, that facilitate the virtualization of I/O operations with IOV enabled endpoints 470-490. The address translation and protection table data structures may be used by the PCIe root complex 440 to perform address translation between virtual and real addresses for virtualized resources, control access to virtual resources based on a mapping of virtual resources to SIs, and other virtualization operations, for example. These root complex interrupt table data structures are accessible through the PCIe memory address space and are used to map interrupts to appropriate interrupt handlers associated with SIs, for example.

As with the approach shown in FIG. 3, a virtualization layer 450 is provided in the virtualization structure of FIG. 4 as well. The virtualization layer 450 is used with non-IOV enabled PCIe endpoints that may be coupled to the PCIe switch 460. That is, the virtualization layer 450, which may be partially or wholly implemented as a hypervisor or other virtualization platform, is utilized with PCIe endpoints in a similar manner as described previously above with regard to FIG. 3 for those PCIe endpoints that do not have native, i.e. internal to the endpoint, support for I/O virtualization (IOV).

For IOV enabled PCIe endpoints 470-490, the virtualization layer 450 is used primarily for configuration transaction purposes and is not involved in memory address space operations, such as memory mapped input/output (MMIO) operations initiated from a SI or direct memory access (DMA) operations initiated from the PCIe endpoints 470-490. To the contrary, data transfers between the SIs 420-430 and the endpoints 470-490 are performed directly without intervention by the virtualization layer 450. Direct I/O operations between the SIs 420-430 and the endpoints 470-490 is made possible by way of the RCVEs 442 and the built-in I/O virtualization logic, e.g., physical and virtual functions, of the IOV enabled PCIe endpoints 470-490. The ability to perform direct I/O operations greatly increases the speed at which I/O operations may be performed, but requires that the PCIe endpoints 470-490 support I/O virtualization.

Figure 1:
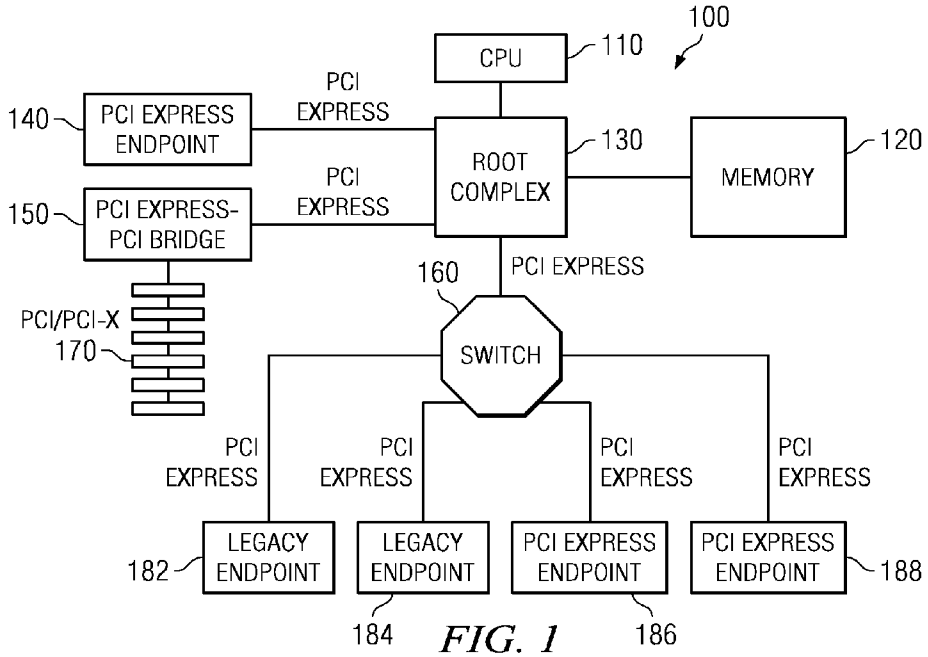
FIG. 1 is an exemplary diagram illustrating a system incorporating a PCIe fabric topology as is generally known in the art.
Figure 5:
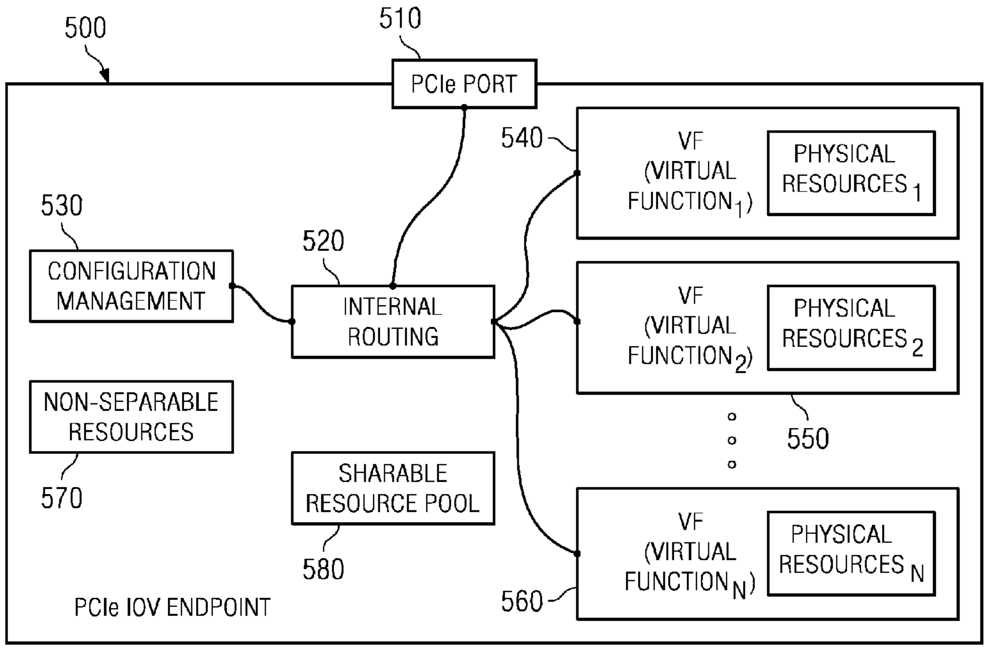
FIG. 5 is an exemplary diagram of a PCIe I/O virtualization enabled endpoint.

FIG. 5 is an exemplary diagram of a PCIe I/O virtualization (IOV) enabled endpoint. As shown in FIG. 5, the PCIe IOV endpoint 500 includes a PCIe port 510 through which communications with PCIe switches, and the like, of a PCIe fabric may be performed. Internal routing 520 provides communication pathways to a configuration management function 530 and a plurality of virtual functions (VFs) 540-560. The configuration management function 530 may be a physical function (PF) as opposed to the virtual functions 540-560. A physical "function," as the term is used in the PCI specifications, is a set of logic that is represented by a single configuration space. In other words, a physical "function" is circuit logic that is configurable based on data stored in the function's associated configuration space in a memory, such as may be provided in the non-separable resources 570, for example.

The configuration management function 530 may be used to configure the virtual functions 540-560. The virtual functions are functions, within an I/O virtualization enabled endpoint, that share one or more physical endpoint resources, e.g. a link, and which may be provided in the sharable resource pool 580 of the PCIe IOV endpoint 500, for example, with another function. The virtual functions can, without run-time intervention by a hypervisor, directly be a sink for I/O and memory operations from a system image, and be a source of Direct Memory Access (DMA), completion, and interrupt operations to a system image (SI).

PCIe endpoints may have many different types of configurations with regard to the "functions" supported by the PCIe endpoints. For example, endpoints may support a single physical function (PF), multiple independent PFs, or even multiple dependent PFs. In endpoints that support native I/O virtualization, each PF supported by the endpoints may be associated with one or more virtual functions (VFs), which themselves may be dependent upon VFs associated with other PFs.

The illustrative embodiments provide a system and method for management of an input/output virtualization (IOV) adapter, such as the IOV enabled PCIe endpoint 500 shown in FIG. 5, through a virtual intermediary in a hypervisor with functional management in an IOV management partition. The mechanisms of the illustrative embodiments address the situation where an input/output (I/O) fabric, which may comprise one or more PCIe switches such as PCIe switch 460 in FIG. 4, is shared by more than one logical partition (LPAR) and where each LPAR can potentially share with the other LPARs an I/O adapter (IOA), e.g., a PCIe endpoint 470-490 in FIG. 4. The illustrative embodiments define a mechanism for one LPAR, the I/O virtualization management partition (IMP), to control the shared functionality of an I/O virtualization enabled IOA through a physical function (PF), while the virtual functions (VFs) are assigned to client partitions for normal direct I/O operations.

In particular, with the mechanisms of the illustrative embodiments, each LPAR is assigned its own separate address space to access a virtual function (VF) assigned to it, and to receive interrupts directly from the VF assigned to it, such that each LPAR's perception is that it has its own independent IOA for purposes of normal I/O operations. The set of VFs of an IOA, such as a PCI Express (PCIe) I/O Virtual (IOV) adapter, or I/O endpoint, may be shared across multiple LPARs, with each LPAR getting its own VF. The mechanisms of the illustrative embodiments provide facilities for management of the shared resources of the IOV adapter, or I/O endpoint, via a Physical Function (PF) of the IOV adapter/endpoint by assignment of that PF to an I/O Virtualization Management Partition (IMP). In addition, the IMP acts as the interface to the PF for purposes of accessing common VF functionality (for example, the network addresses for the VFs for a network adapter), which will be referred to here as the adapter south-side management.

A hypervisor provides IOV independent facilities to the code running in the IMP. The IMP may include device specific code without the hypervisor needing to sacrifice its size, robustness, and upgradeability. The hypervisor provides the virtual intermediary functionality for the sharing and control of the IOV adapter's control functions. More specifically, the code running in the hypervisor acts as a virtual intermediary (VI) to the VFs for purposes of fully managing the VF error handling, VF reset, and configuration operations.

Figure 6:
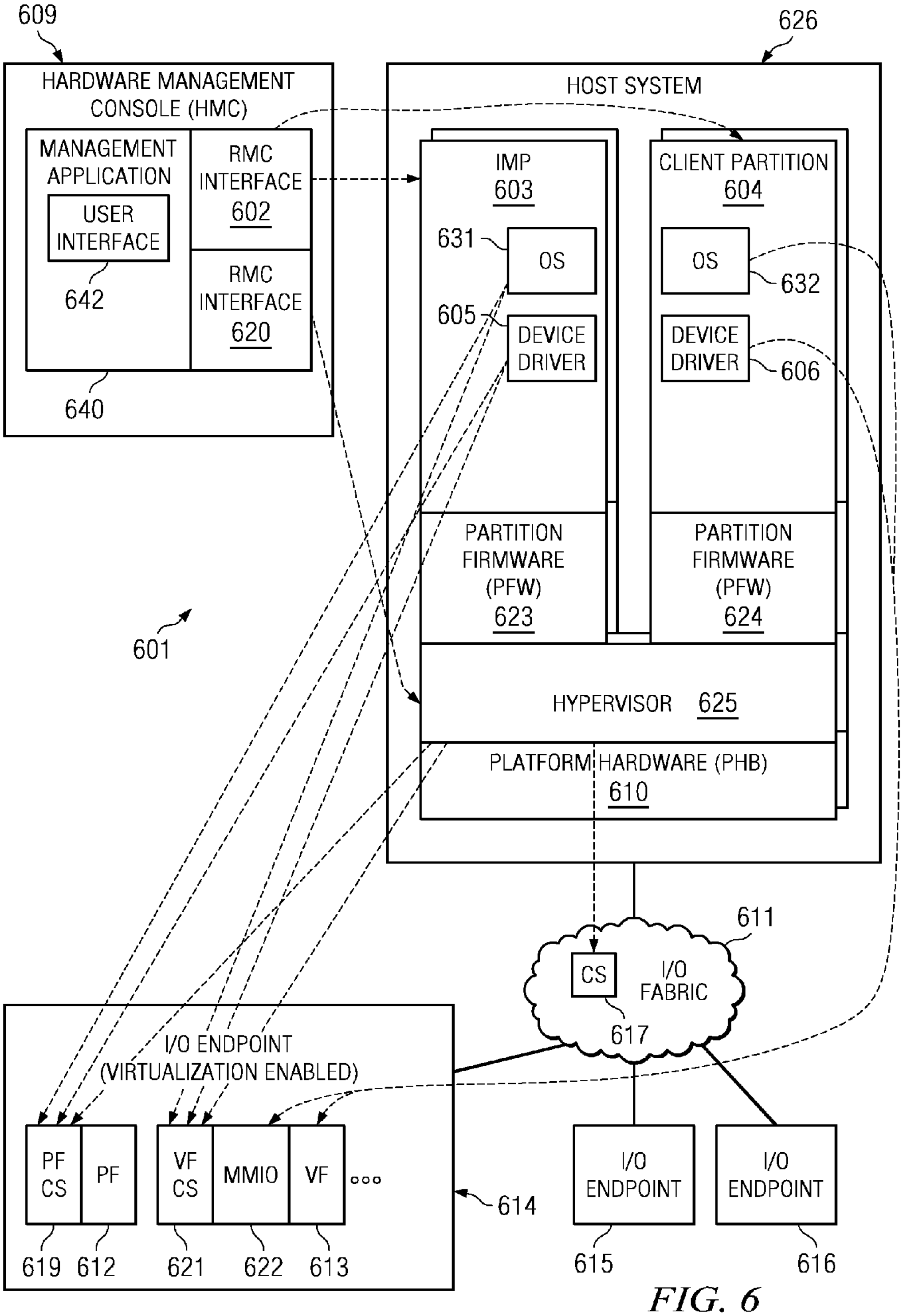
FIG. 6 is an exemplary diagram of a system structure in which IOV enabled endpoints, or adapters, are utilized in accordance with one illustrative embodiment.

FIG. 6 is an exemplary diagram of a system structure in which IOV enabled endpoints, or adapters, are utilized in accordance with one illustrative embodiment. The mechanisms shown in FIG. 6 may be implemented in conjunction with the mechanisms illustrated in FIG. 4. For example, the IMP 603 shown in FIG. 6 may be provided in association with system image 1 420 in FIG. 4 while client partition 604 in FIG. 6 may be provided in association with system image 2 430 of FIG. 4. Similarly, the I/O fabric 611 of FIG. 6 may include the PCIe switch 460 in FIG. 4, IOV endpoint 614 may be similar to any one of PCIe endpoints 470-490 in FIG. 4, and endpoints 615, and 616 may be either IOV enabled endpoints or non-IOV enabled endpoints, such as endpoints 370-390 in FIG. 3.

As shown in FIG. 6, the system 601 comprises a host system 626 which may be any data processing device, e.g., a server, client computing device, or the like, an I/O fabric 611 which may include one or communication links and one or more switches, and one or more I/O endpoints 614-616 which may be, in one illustrative embodiment, PCIe I/O endpoints with I/O endpoint 614 being an IOV enabled endpoint while the other endpoints 615-616 may be IOV enabled or non-IOV enabled endpoints. The host system 626 comprises platform hardware 610 which is the underlying hardware of the data processing device, a hypervisor 625, logical partitions (LPARS) 603 and 604, and corresponding partition firmware (PFW) 623 and 624. While the illustrative embodiments are described herein with regard to use with a hypervisor 625, it will be appreciated that other types of virtualization platforms may be utilized without departing from the spirit and scope of the present invention.

The hypervisor 625, in one illustrative embodiment, may be code that executes on the platform hardware 610, and is part of the platform's firmware. Similarly, the partition firmware (PFW) 623-624 may also be part of the platform's firmware, but is shown in association with the LPARs 603 and 604 since they are logically considered to be part of the LPARs' code executing within the LPAR.

The LPARs 603 and 604 have allocated resources and an operating system image or instance that executes within the LPAR. In addition, the LPARs 603 and 604 may execute other applications, software, code, or the like within the LPAR. For example, with particular importance to the illustrative embodiments, one of the LPARs, e.g., LPAR 603, executes code that causes the LPAR 603 to operate as an IOV Management Partition (IMP) 603. Other LPARs 604 may operate as client partitions. While only one IMP 603 and one client partition 604 are shown in FIG. 6, it should be appreciated that more than one IMP 603 and client partition 604 may be provided in a host system 626 without departing from the spirit and scope of the illustrative embodiments.

The hypervisor 625 has access to configuration spaces 619, 621 of the IOV endpoint 614 and to the I/O fabric 611 configuration space 617. The term "configuration space" as it is used herein refers to a disjoint address space from the memory mapped I/O (MMIO) address space that is allocated for use in storing configuration data for a particular component of the system 601. Further, the IMP's operating system 631 and device driver 605 have access to the configuration space 619 for the Physical Functions (PFs) 612 when they are assigned to the IMP 603, and have access to the configuration spaces 621 of the Virtual Functions (VFs) 613 that belong to the PF assigned to the IMP 603. The client partition's operating system 632 and device driver 606 have direct access to any of the configuration spaces 621 of the VFs 613 which are assigned to them. The hypervisor 625 acts as an intermediary, or more specifically, as a Virtual Intermediary (VI) to make sure that the client partitions have access to the configuration spaces that they need to properly operate their VFs 613, but not to configuration spaces that could cause problems with other client partitions. That is, the client partitions 604 only have access to the configuration space allocated for their VFs 613. The client partitions 604 further have access to the Memory Mapped I/O (MMIO) space 622 for their assigned VFs 613.

A management application 640 on a Hardware Management Console (HMC) 609, which may be resident on the host system 626 or in a separate data processing device (as shown), and the HMC 609 itself, communicate through a Remote Management Command (RMC) interface 602 to the IMP 603 and client partitions 604 and through the same type interface 620 to the hypervisor 625. The management application 640 (referred to hereafter collectively with the HMC 609 as simply as the HMC 609), acts as the orchestrator to control functionality across the various components in the system 601, and provides a user interface 642 for a human to view system configurations and to input information about what resources that they want assigned to what LPARs 603-604. The management application 640 may provide many different functions which may be invoked by the user as described in greater detail hereafter. Alternatively, these functions may be automatically invoked without user intervention in response to an event or input triggering the initiation of such functions.

As mentioned above, the client partitions 604 may directly communicate with the IOV enabled endpoint 614 to access the configuration spaces 621 of their virtual functions (VFs) 613 in an IOV enabled endpoint 614. The hypervisor 625 acts as a virtual intermediary (VI) for such communications and prevents the client partitions from performing configuration operations on configurations spaces that would affect other client partitions, e.g., on configuration spaces of virtual functions (VFs) not assigned to that client partition FIG. 7 is an exemplary diagram illustrating a definition of a set of exemplary Logical Partition (LPAR) to platform firmware calls in accordance with one illustrative embodiment. In particular, FIG. 7 illustrates exemplary platform firmware calls 700 that can be used to implement aspects of the illustrative embodiments, as well as illustrates to which partitions (client or IMP) that these calls apply. These calls may be performed by the partitions 603 or 604 to the associated platform firmware 623 or 624 in FIG. 6, for example. Examples of the usage of these LPAR to platform firmware calls 700 will be given in the descriptions of various ones of FIGS. 9-17 hereafter. Descriptions of these calls will be made with continuing reference to the elements of FIG. 6 as exemplary of the elements that may perform the operations associated with these calls.

A first call 702, i.e. the read/write I/O configuration space call 702, is used by the client partition 604 to access a configuration space 621 of its associated VFs 613. The hypervisor 625 acts as a VI for these calls and prevents the client partitions 604 from performing configuration operations that would affect other client partitions. This call is also used by the IMP 603 to configure its PFs 619 with the hypervisor 625 again acting as the VI to prevent the IMP 603 from accessing the configuration spaces of PFs and VFs that are not part of its domain of control. In addition, as a VI in the IOV environment, the hypervisor 625 also needs to perform the actions specified by the PCI SIG IOV specification For example, some of the configuration fields are not replicated in a VF and so, the VI provided by the hypervisor 625 has to obtain those fields from the PF's configuration space 619 when accessed through the VF's configuration space 621.

The reset PF call 704 is one of the PF specific calls that may be made by the IMP 603. This call resets the PF, e.g., PF 612, and as a result, also resets all the VFs, e.g., VF 613, associated with the PF. When this call is made, the IMP 603 must first use the disable VF call 706, described hereafter, to disable all VFs associated with the PF, reset the PF, and then restore all the VF configurations to what they were before the PF reset.

The disable VF call 706 informs the platform firmware to disable any further MMIO operations to the VF(s) specified and to prevent Direct Memory Access (DMA) and interrupts from the VF(s) from getting through to the client partition 604. There are a number of ways to implement this to make sure that data integrity issues do not happen. In one illustrative embodiment, the hardware may be designed in such a way that if a client partition 604 tries to perform an MMIO Load operation from its VF, the client partition 604 may receive back all-1's data, just as though the VF was not there. The device driver 606 is expected to check for all-1's data when it is not expecting all-1's data, and to use the query PF/VF error state firmware call 710, described hereafter, to verify whether or not the all-1's represents an error state. The disable VF call 706 is expected to be used primarily in error recovery scenarios and thus, may invoke the VF driver, e.g., device driver 606, to enter into its own recovery, as described above and further described hereafter.

The client partitions 604 may reset their VFs 613 by using the reset VF call 708. The hypervisor 625 acts as a VI and validates that the VF 613 specified in the reset VF call 708 is assigned to the partition prior to issuing the reset to the VF 613. In this way, the hypervisor 625 prevents one client partition from resetting another client partition's VF(s). The hypervisor keeps track of which VFs are assigned to what partitions, because the hypervisor is involved in those assignment operations, as will be detailed later, and can keep that information around for validation operations such as these, for example, by storing that information in one of the hypervisor's data structures.

The query PF and VF error state call 710 is a call to the platform firmware that allows the PF driver, e.g., device driver 605, in the IMP 603, or the VF driver, e.g., device driver 606, in the client partition 604 to get the error state information for its PF 612 or VF 613, respectively. This error state information may be obtained by the hypervisor from the hardware status registers, for example in the platform hardware 610. This error state may be set by the occurrence of an error in the operations of the I/O endpoint 614, for example, and may be used by the PF driver, e.g., device driver 605, in the IMP 603, or the VF driver, e.g., device driver 606, in the client partition 604 to be able to recover from errors. This error state information may be cleared from the hardware by a Reset PF 704 or Reset VF 706 call, for example.

To obtain platform error data for error recovery, the enable PF and VF for Load and Store operations call 712 and query I/O fabric error information call 714 are provided. When the query PF and VF error state call 710 returns error state information indicating to the appropriate device driver 605 or 606 that its associated PF 612 or VF 613 is in an error state, the device driver 605, 606 may use the enable PF and VF for Load and Store operations call 712 to open up a path to the PF 612 or VF 613 without allowing the DMA path to open. The device driver 605, 606 may then use MMIO Load and Store operations to get state information from the I/O endpoint 614 for problem determination purposes. The query I/O fabric error information call 714 may be used to get non-device-specific error information for problem determination in addition to the device specific error information from the MMIO Load and Storage operations.

The query interrupt source call 716 is used on all interrupts to get the interrupt source in order to virtualize the interrupt controller. Thus, as depicted in FIG. 7, the query interrupt source call 716 may be used by both the client partition 604 and the IMP 603. The setup DMA translation call 718 is used to setup a translation mechanism for translating an I/O address to a system address. Such address translation mechanisms are required for I/O virtualization. The hypervisor 625 acts as a VI for these calls and prevents the client partitions 604 from setting up address translations that would affect other client partitions. The hypervisor 625 is responsible for assigning resources, for example memory, processors, and I/O resources, to the various partitions, and thereafter keeps that information in its data structures for validating a partition's authority for accessing that resource, e.g., a particular memory address. As shown in FIG. 7, the setup DMA translation call 718 may be used by the client partition 604 but not generally the IMP 603 because the PF does not generally need to do DMA operations to the IMP 603.

Finally, the Add/Remove VF from LPAR use call 720 and Add/Remove PF from LPAR use call 722 are for use in IOA Hot Plug and dynamic reconfiguration operations, as will be described hereafter. The Add/Remove VF from LPAR use call 720 may be used by the client partitions 604 but not the IMP 603 since, by definition, the VFs are not assigned to the IMP 603 and the owner of the VF controls the hot plugging of the VF. The Add/Remove PF from LPAR use call 722 may be used by the IMP 603 but not the client partitions 604. The client partition 604 is not permitted to change the PF in any way and thus, cannot use the Add/Remove PF from LPAR use call 722 since allowing the client partition 604 to do so may pose a security issue for VFs associated with other client partitions that are associated with the PF.

FIG. 8 is an exemplary diagram illustrating a definition of a set of exemplary Hardware Management Console (HMC) to platform requests and responses in accordance with one illustrative embodiment. In particular, FIG. 8 illustrates exemplary HMC to platform firmware request/responses 800 and identifies to which component in the system that this request is expected to be made as well as the component's expected response. These calls may be made, for example, by the HMC 609 in FIG. 6, via one or more of the interfaces 602 and 620. For example, if the HMC 609 makes a call that is targeting either the IMP 603 or the client partition 604, the HMC 609 may make the call via the RMC interface 602. If the HMC 609 is making a call that targets the hypervisor 625, e.g., a hypervisor, then the call may be made via the interface 620. Examples of the usage of these HMC to platform requests/responses 800 will be provided in greater detail with regard to various ones of FIGS. 9-17 hereafter.

As shown in FIG. 8, the hypervisor 625 may be queried for the I/O fabric configuration by use of the query I/O fabric configuration request 802. This request 802 may be used by the HMC 609, for example, on initial system bring-up to get all the possible I/O devices and their functions, so that these can be presented to the user for selection and assignment to the various LPARs that the user wishes to configure.

The set initial LPAR I/O configuration request 804 is used by the HMC 609 to inform the hypervisor 625 what the user at the HMC 609 has decided to configure. This configuration includes not only the I/O configuration, but also the LPAR configuration characteristics, such as the number of CPUs assigned and the amount of memory assigned to the various LPARs in the system.

The hypervisor 625 may also be informed by the HMC 609 when to power up and power down an I/O adapter or endpoint. This may be accomplished through the power up/down IOA request 806.

There are several HMC to platform requests 808-812 that are used by the HMC to direct the dynamic addition of a PF or VF to the system, i.e. while the system is operational and after initial configuration. The dynamic add of PF/VF request 808 is used by the HMC 609 to inform the hypervisor 625 to expect the addition of specific resources to an LPAR or to multiple LPARs. The hypervisor 625 needs to be informed in advance of the intent to add such resources so that it can allocate resources for those LPARs. In this way, when the LPAR requests the hypervisor 625 to add a VF or PF to its LPAR, that the hypervisor 625 is already prepared to allocate those resources.

Once the hypervisor 625 has completed the dynamic add of PF/VF request 808, the IMP 603 and client partitions 604 may be informed of any additions. The dynamic add of a PF request 810 informs the IMP 603 that a new PF is available to be added. This might happen, for example, on a hot plug add of an I/O adapter or endpoint to a system, as discussed hereafter. This request 810 informs the IMP 603 to add the PF to its fabric configuration, initialize the PF configuration space, load the device driver, and enable the PF's IOV capability. The IMP 603 signals completion of the operation to the hypervisor 625 by the "add" capability of the add/remove PF from LPAR use call 722 in FIG. 7.

The dynamic add of a VF request 812 informs a client partition 604 that a new VF is available to be added. This might happen, for example, on a hot plug add of an I/O adapter or endpoint to a system or when the user wants to add additional capability of an already existing I/O adapter or endpoint with unused VFs, to a client partition 604. This request 812 informs the client partition 604 to add the VF to its fabric configuration, initialize the VF configuration space, load the device driver, and begin using the VF. The client partition 604 signals completion of the operation to the hypervisor 625 by the "add" capability of the add/remove VF from LPAR use call 720.

There are several HMC to platform requests 814-818 that are used by the HMC 609 to direct the dynamic removal of a PF or VF from the system, i.e. while the system is operational and after the initial configuration. The dynamic remove of PF/VF request 814 is used by the HMC 609 to inform the hypervisor 625 to expect the removal of specific resources from an LPAR or from multiple LPARs. The hypervisor 625 needs to be informed in advance so that it can de-allocate resources for those LPARs after the removals are signaled by the LPAR(s). Once the hypervisor 625 has completed the dynamic remove of PF/VF request 814, the IMP 603 and client partitions 604 may be informed of any removals.

The dynamic remove of a VF request 816 is then used by the HMC 609 to inform a client partition 604 that a VF needs to be removed from use and from the LPAR's configuration. This might happen, for example, on a hot plug remove of an I/O adapter or endpoint from a system or when the user wants to remove a capability of an already existing I/O adapter or endpoint from a client partition 604, for example so that it may be re-assigned to another LPAR for that LPAR's use. This request informs the client partition 604 to stop using the VF, request reset of the VF, remove the device driver, and remove the VF from the OS's fabric configuration. The client partition 604 signals completion of the operation to the hypervisor 625 by the "remove" capability of the add/remove VF from LPAR use call 720.

The dynamic remove of a PF request 818 informs an IMP 603 that a PF is to be removed. Prior to issuing this request, the HMC 609 must have removed all VFs associated with the PF from the using client partitions 604, as described above. Removal of a PF might happen, for example, on a hot plug remove of an I/O adapter or endpoint from a system. This request 818 informs the IMP 603 to stop using the PF, request reset of the PF through the reset call 704, remove the device driver, and remove the PF from the OS's fabric configuration. The IMP 603 signals completion of the operation to the hypervisor 625 by the "remove" capability of the add/remove PF from LPAR use call 722.

An important function of the IMP 603 is to provide secure access to resources of the I/O adapter or endpoint that are either shared across the multiple LPARs that are using the VFs associated with a PF, or are unique to a VF but which should not be accessible for change by the PF. One example of such a resource of a network I/O adapter or endpoint is the network address associated with a PF which is shared by the VFs, or a network address that is unique to a VF. Management of these device-specific resources will be referred to here as "south side" management of the I/O adapter or endpoint. This is accomplished through the HMC 609 by the I/O adapter (IOA), or endpoint, south side management request 820, and all such management is secured via a security application on the HMC 609, e.g., a logon application or other authentication application. When the IMP 603 receives an IOA south side management request 820 for an IOA, the IMP 603 passes the request to the device driver 605 for the PF, and the device driver 605 makes the device-specific request through a PF interface to the IOA in order to accomplish the request.

The current status of all of the HMC to platform requests 800 may be made to the target of the original request by use of the query previous command completion and status request 822. This allows the HMC 609 to coordinate a series of HMC requests, and to indicate to the user through an HMC interface a status of a previous request. Such a request may be made because some operations may be rather slow to complete and it is desirable to be able to access the current statues of such requests.

The present description now turns to a more detailed explanation of the use of the various requests and calls illustrated above in FIGS. 7-8. FIGS. 9-17 are flowcharts outlining various operations of the mechanisms of the illustrative embodiments. The operations outlined in FIGS. 9-17 may be implemented by the various mechanisms, e.g., HMC, hypervisor, IMP, client partition, platform firmware/hardware, I/O endpoint, and the like, depicted in FIG. 6, for example. Thus, where appropriate, reference will be made to elements of FIG. 6 as one example of the mechanisms of the illustrative embodiments that may participate in the performance of the operations outlined in FIGS. 9-17.

It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

Figure 9:
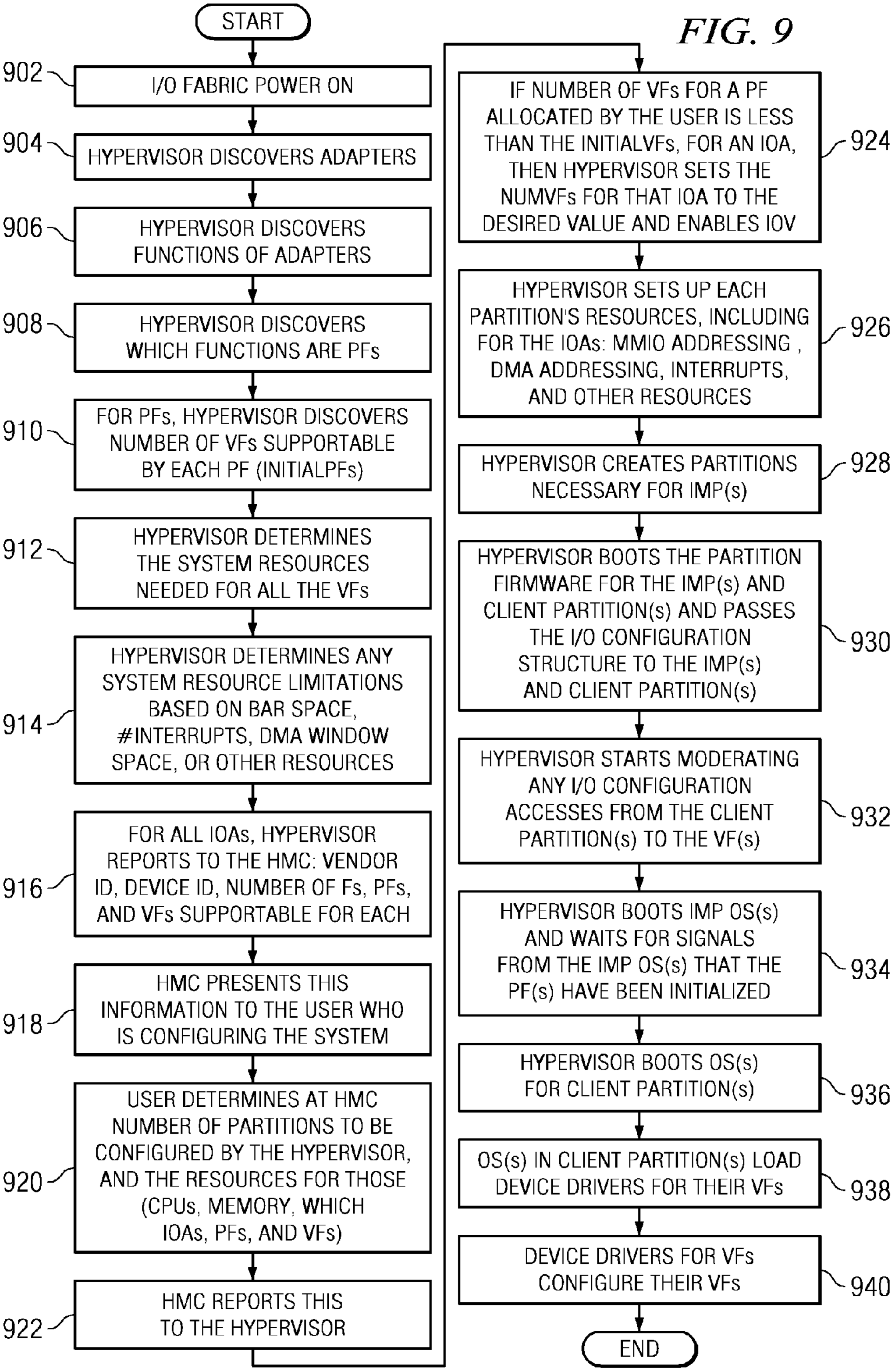
FIG. 9 is a flowchart outlining an exemplary "bring-up" operation for a system with I/O Virtualized (IOV) adapters in accordance with one illustrative embodiment.

FIG. 9 is a flowchart outlining an exemplary "bring-up" operation for a system with I/O Virtualized (IOV) adapters in accordance with one illustrative embodiment. As shown in FIG. 9, the initial I/O fabric bring-up operation 900 starts with an I/O fabric power on being performed (step 902). In response to the power-on of the I/O fabric, the hypervisor 625 may discover, such as by probing a configuration space of the I/O fabric 611, all the I/O adapters 614-616 coupled to the I/O fabric 611 (step 904), the functions of the I/O adapters 614-616 found by the discovery operation (step 906), and which of the discovered functions are PFs 612, such as by detection of the IOV configuration space (step 908).

For PFs, the hypervisor 625 may probe the configuration space further to determine the number of VFs supportable by each PF (step 910), such as by reading an InitialVFs field in the configuration space of each PF, for example. The hypervisor 625 may then determine all the system resources necessary for the I/O adapters (IOAs) 614-616 in the system 601, and more specifically in this case, those resources needed by the VFs (step 912). Resources include items such as I/O address space required for mapping the IOA into the memory space for Memory Mapped I/O (MMIO) load and store operations from the processors in the system, the number of Requester Identifiers (RIDs) needed, the amount of DMA window space needed, and the number of interrupts needed, and the like. The DMA window space is the amount of table space needed for the address translation facilities in the Root Complex (RC).

Once the determination has been made as to the resources needed, the hypervisor 625 may determine if it needs to limit the number of VFs that get enabled, due to resource restrictions in the system 601 (step 914). The hypervisor 625 may then report all the information it has collected from probing the I/O configuration space to the HMC 609 (step 916), such as for presentation to a user. The HMC 609 may report this information to the hypervisor as a response to the query I/O fabric configuration HMC request 802 in FIG. 8, for example. The user may then assign resources to the LPARs or to the available pool of free resources. The information reported may include, for example, information that the user needs in order to make the decision on what is in the I/O fabric and endpoints, including items such as the Vendor ID, Device ID, and number of functions. The information may further include a number of PFs supported by the I/O adapters or endpoints, a number of VFs supportable for each PF, such as may be determined by the PFs' InitialVFs and the calculation of the number of supportable VFs due to system limitations as calculated by the hypervisor 625 in the manner mentioned above, and the like.

It is now up to the user at the HMC 609 to determine how they want to allocate all the system resources. Note that this could also be done by automated scripts running in the HMC 609, rather than a human being, or any other automated mechanism for assigning or allocating system resources to logical partitions of the system 601. The HMC 609 hence, in the exemplary embodiment, presents the I/O fabric and endpoint information collected to the user (step 918) and the user specifies how the resources are to be allocated (step 920). This allocation not only includes I/O, but will also include other system resources such as processors and memory. Once the user has made the assignments of resources, this is reported to the hypervisor 625 (step 922) via the set initial LPAR I/O configuration HMC request 804 in FIG. 8, for example.

For VFs, if the number of VFs specified by the user (both assigned and free pool) are less than InitialVFs for the corresponding PF, then the hypervisor 625 may set a NumVFs configuration space parameter of the PF to the desired value, and may enable I/O virtualization for the PFs via a VF enable bit as defined by the PCI IOV specification (step 924). The hypervisor 625 may then sets up each partition's resources including MMIO addressing, DMA addressing, interrupts, and other resources (step 926) and may create partitions necessary for the IMP(s) 603 (step 928).

The hypervisor 625 may then boot the partition firmware 623 and 624 for the IMP(s) 603 and client partition(s) 604 and may pass the I/O configuration structure to the IMP(s) 603 and client partition(s) 604 for use by the OSs in those LPARs (step 930). The hypervisor 625, on assignment of the VF(s) 613 to the client partition(s) 604, starts moderating, i.e. starts acting as a virtual intermediary, for all I/O configuration accesses from the client partition(s) 604 to their VF(s) 613 (step 932). The hypervisor 625 may boot the IMP partitions' OS(s) and then may wait for an indication from the IMP(s) 603 that the PF(s) 612 have been initialized (step 934). The IMP(s) 603 may give this indication via the "add" function of the add/remove PF from LPAR use firmware call 722 in FIG. 7, for example.

Once the IMP 603 for a VF 613 has initialized the PF 612, the OS for the VF 613 may be loaded (step 936). The client partition(s) 604 may load the device drivers 606 for their VF(s) 613 (step 938). Once a device drive 606 is loaded for a VF 613, it needs to configure its VF 613 via the read/write I/O configuration space call 702 (step 940), for example. The device driver 606 may then begin to use its VF 613 and the operation then terminates.

Figure 10A:
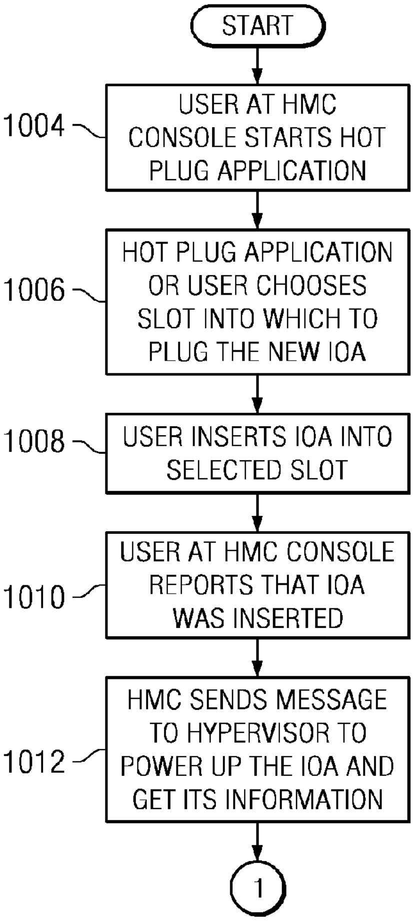
FIGS. 10A-10B are a flowchart outlining an exemplary hot-plug operation for adding an IOV adapter to a system in accordance with one illustrative embodiment.
Figure 10B:
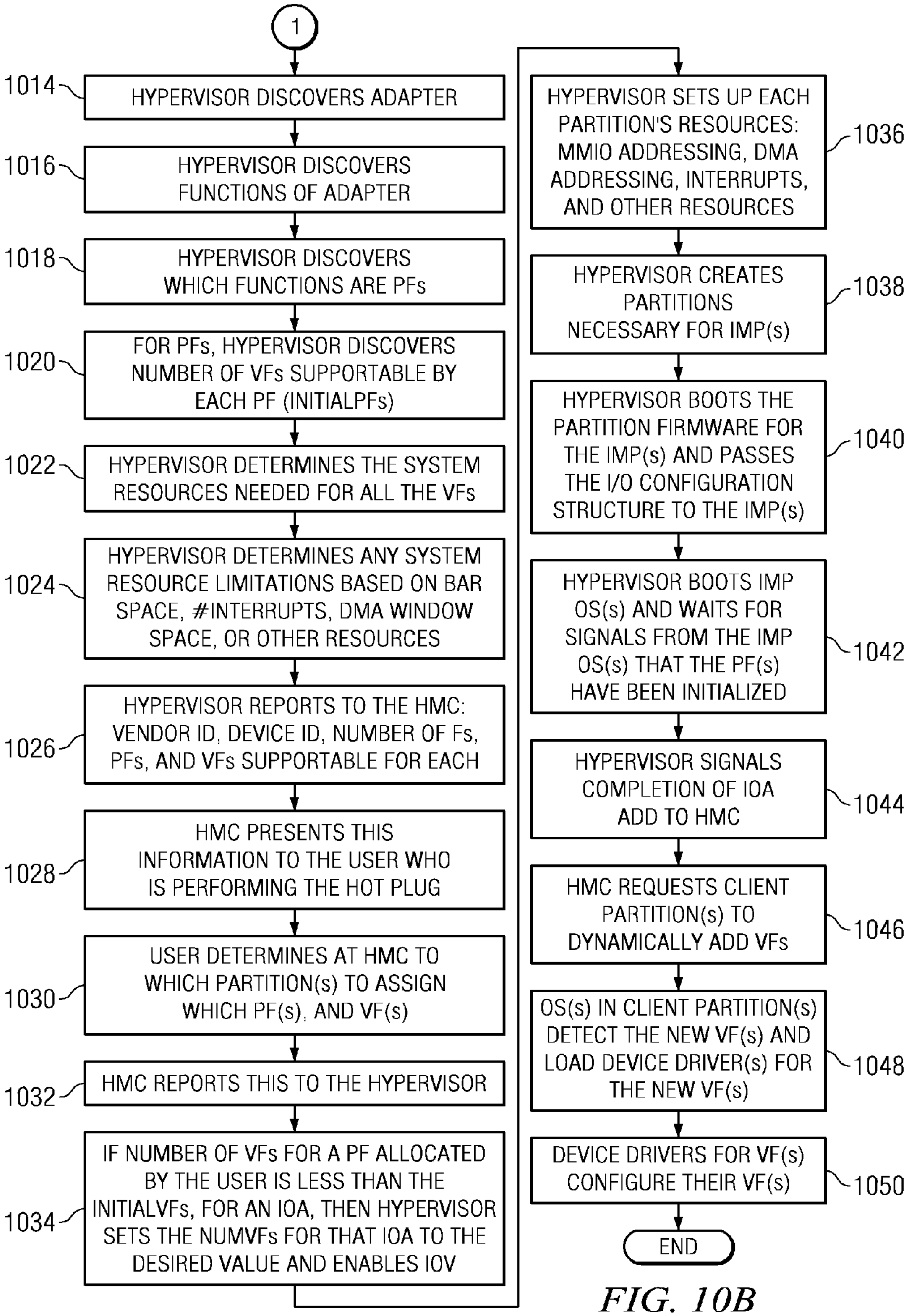

Once the system is up and operational, it is desirable to be able to add new I/O adapters or endpoints dynamically to the system. FIGS. 10A-10B are a flowchart outlining an exemplary hot-plug operation for adding an IOV adapter to a system in accordance with one illustrative embodiment. As shown in FIGS. 10A-10B, the hot-plug addition operation 1000 starts with the user, at the HMC console 609, starting a hot-plug application (step 1004) which provides a user interface to direct the user through the hot-plug operation. From the hot-plug application, the user or the application may select an empty I/O slot in the I/O fabric 611 into which to plug the new I/O adapter or endpoint, e.g., I/O endpoint 614 (step 1006). The user may then plug-in the new I/O adapter (IOA) or endpoint (step 1008) and may report via the HMC 609 that the IOA has been plugged-in (step 1010). Those skilled in the art recognize that hot-plug applications for I/O buses, such as PCIe, can be invoked automatically by inserting a new IOA into an unused slot and having the system automatically invoke the hot-plug application. The HMC 609 may then send a message to the hypervisor 625 to power up the IOA by using the "power up" capability of the power up/down HMC request 806 in FIG. 8, for example, and may get its configuration information (step 1012), and the operation continues to step 1014 in FIG. 10B.

In a similar manner that the hypervisor 625 gathered information in the initial fabric bring-up operation 900, the hypervisor 625 may discover the IOA (step 1014), may discover the functions on the IOA (step 1016), and may discover which functions are PFs (step 1018). For PFs, the hypervisor 625 may discover the number of VFs supportable by each PF (step 1020), may determine the system resources necessary (step 1022), determines the system resource limitations (step 1024), and may report the IOA configuration information to the HMC 609 (step 1026).

The HMC 609 may present the configuration information to the user (step 1028). The user may specify which resources to assign to which client partitions (step 1030) and the HMC 609 may report this resource allocation to the hypervisor 625 (step 1032) and the hypervisor 625 may set the NumVFs in the configuration space if necessary (step 1034). The hypervisor 625 may set up each partition's resources (step 1036) and may create partition(s) for the new IMP(s) 603 (step 1038). The hypervisor 625 may boot the IMP(s) 603 and pass the I/O configuration structure to those IMP(s) 603 (step 1040), may boot the IMP OS(s), and may wait for signals from the IMP OS(s) that the PFs 612 have been initialized (step 1042). At this point, the IOA addition is complete except for the VF 613 addition and the hypervisor 625 may signal the PF 612 addition complete to the HMC 609 (step 1044).

The HMC 609 may now issue a dynamic add of VF request 812 to the client partition(s) 604 which are to receive a VF 613 from the new IOA 614. This starts the client partition 604 processes to add the VF(s) (step 1046). The OS(s) in the client partition(s) 604 may detect the new VF(s) 613 and may load device driver(s) 606 for the new VF(s) 613 (step 1048). The device driver(s) 606 for the VF(s) 613 may configure their VF(s) 613 via the read/write I/O configuration space call 702 (step 1050), for example, and may begin using their newly configured VF(s) 613. The operation then terminates.

Figure 11:
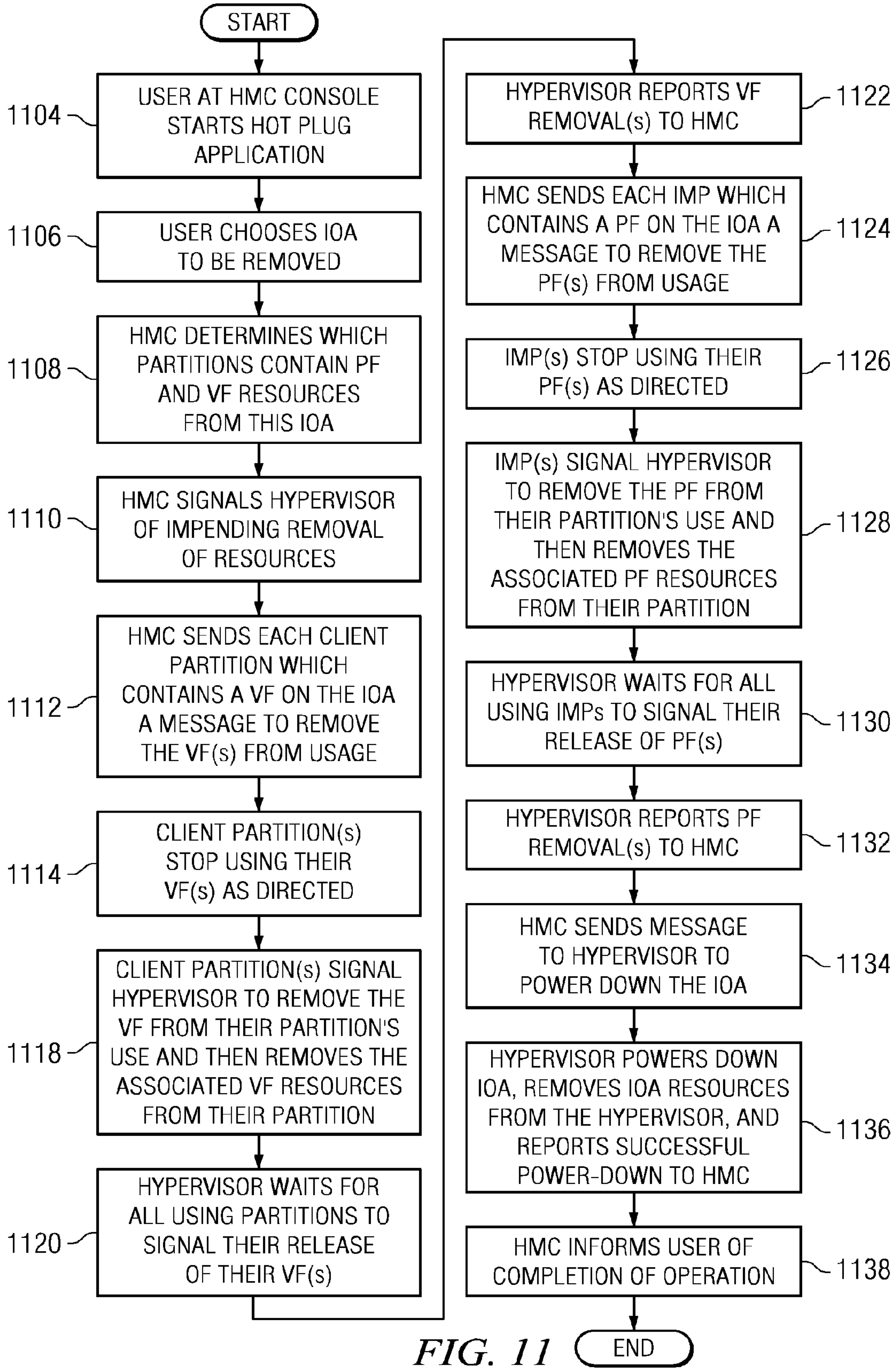
FIG. 11 is a flowchart outlining an exemplary hot-plug operation for removing an IOV adapter from a system in accordance with one illustrative embodiment.

In addition to dynamically adding I/O adapters or endpoints to the I/O fabric 611 of the system 601 of the illustrative embodiments, it is beneficial to be able to allow I/O adapters or endpoints to be dynamically removed from the I/O fabric 611. FIG. 11 is a flowchart outlining an exemplary hot-plug operation for removing an IOV adapter from a system in accordance with one illustrative embodiment. As shown in FIG. 11, the hot-plug removal operation 1100 starts with the user at the HMC console 609 starting the hot-plug application (step 1104). The user may choose that an I/O adapter (IOA) or endpoint, such as I/O endpoint 614, be removed (step 1106).

The HMC 609 determines which partitions, if any, contain PF 612 and VF 613 resources from the IOA to be removed (step 1108). The HMC 609 may signal the hypervisor 625 of the impending removal of the resources (step 1110) by use of the dynamic remove of PF/VF request 814, for example. The HMC 609 may then send each client partition 604 which contains a VF 613 on the IOA, a request to remove the VF from usage (step 1112) via a dynamic remove of VF request 816, for example. The client partition(s) 604 may stop using their VF(s) 613 associated with the dynamic remove of VF request 816 (step 1114).

The client partition(s) 604 may signal the hypervisor 625 to remove their VF(s) 613 from use by the client partition(s) 604 (step 1118) via the "remove" capability of the add/remove from LPAR use call 720, for example. The hypervisor 625 waits for all using client partitions 604 to signal their release of their VF(s) (step 1120) and then may report the VF removal (s) to the HMC 609 (step 1122).

The VF removal being complete, the HMC 609 may now start the process of removing the PF(s) 612 associated with the IOA 614. The HMC 609 does this by sending each IMP 603 which contains a PF 612 on the IOA 614 a message to remove the PF(s) 612 from usage (step 1124) via the dynamic remove of PF request 818, for example. The IMP(s) 603 may then stop using the specified PF(s) 612 as directed (step 1126) and signal the hypervisor 625 to remove the PF 612 from their partition's use by the "remove" capability of the add/remove PF from LPAR use call 722. The IMP(s) 603 may then remove the associated PF 612 resources from their partition (step 1128).

The hypervisor 625 waits for all using IMP(s) 603 to signal their release of the PF(s) 612 (step 1130) and may then report the PF removal(s) to the HMC 609 (step 1132). The IOA 614 is now no longer in use, and the HMC 609 may send a message to the hypervisor 625 to turn off power to the IOA 614 (step 1134) via the "power down" capability of the power up/down IOA request 806, for example. The hypervisor 625 may then power down the IOA 614, may remove the IOA 614 resources from the hypervisor 625, and may report completion to the HMC 609 (step 1136). The HMC 609 may report the completion to the user (step 1138), whereas the user can then unplug the IOA 614, if desired, and the operation is complete.

Figure 12:
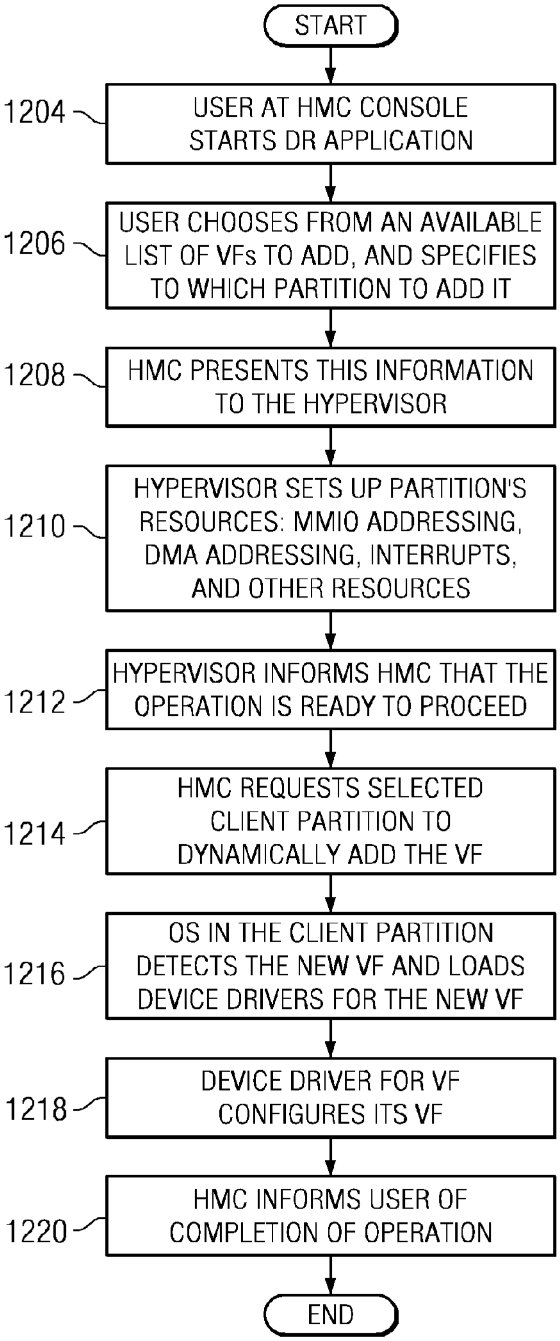
FIG. 12 is a flowchart outlining an exemplary operation for dynamically adding a virtual function (VF) to a logical partition (LPAR) in accordance with one illustrative embodiment.

One of the useful features of I/O virtualization and the implementation of VFs is the capability to have enough resources in the system to dynamically shift those resources around when necessary for load balancing. This can be done by having a pool of available resources from which VFs can be selected for adding to an LPAR, or by removing a VF from an LPAR that is not necessarily making good use of the VF's resources and adding the VF to a LPAR that can make better use of the VF's resources. FIG. 12 is a flowchart outlining an exemplary operation for dynamically adding a virtual function (VF) to a logical partition (LPAR) in accordance with one illustrative embodiment. The operation outlined in FIG. 12 may be used to shift the VF's resources from one LPAR to another when needed to optimize the operation of the system 601, for example.

As shown in FIG. 12, the VF addition operation 1200 starts with the user at the HMC 609 starting a Dynamic Reconfiguration (DR) application (step 1204). The user may choose from an available list of VFs 613 to add, and may specify to which client partition to add the VF 613 (step 1206). The HMC 609 may present this information to the hypervisor 625 (step 1208) via the dynamic add of PF/VF request 808, for example. The hypervisor 625 may set up the client partition's resources, including MMIO addressing, DMA addressing, interrupts, and the like (step 1210).

The hypervisor 625 may inform the HMC 609 that the operation is ready to proceed (step 1212) by signaling completion of the requested operation. The HMC 609 may next request the client partition 604 to dynamically add the VF 613 (step 1214) via the dynamic add of VF request 812. The client partition 604 may detect the new VF 613 and may load the device driver 606 for the new VF 613 (step 1216). The device driver 606 for the VF 613 may configure its VF 613 (step 1218) via the read/write I/O configuration space call 702, for example. Finally, the HMC 609 may inform the user of the completion of the operation and the operation is complete (step 1220).

Figure 13:
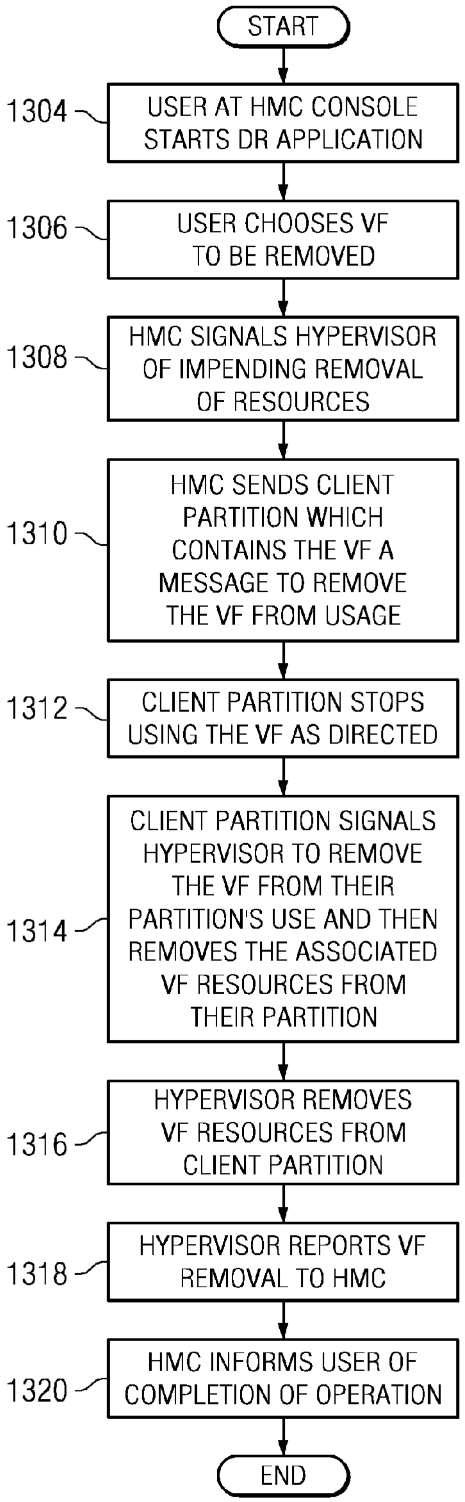
FIG. 13 is a flowchart outlining an exemplary operation for dynamically removing a VF from a LPAR in accordance with one illustrative embodiment.

FIG. 13 is a flowchart outlining an exemplary operation for dynamically removing a VF from a LPAR in accordance with one illustrative embodiment. The dynamic VF remove operation 1300 in FIG. 13 is the other piece of the capability to move around I/O resources between the various LPARs of the system 601. That is, a VF may be removed from its association with one LPAR using the operation shown in FIG. 13 and then added to another LPAR using the VF add operation outlined in FIG. 12 above. This remove of a VF from one partition and adding to another partition may be done by a manual user process, as indicated in the detailed examples, or may be done automatically by determination by a program that the VF is underutilized by one partition and could be used by another partition. Such load balancing programs are known in the art for resources like memory. The VF dynamic remove and add of the present invention described here can be used to extend the load balancing programs to balance I/O resources as well.

As shown in FIG. 13, the VF removal operation 1300 starts with the user starting the DR application at the HMC 609 (step 1304). The user may choose a VF, such as VF 613, to be removed (step 1306) and the HMC 609 may send a dynamic remove PFVF request 818, for example, to the hypervisor 625 (step 1308). The HMC 609 may send a dynamic remove of VF request 816, for example, to the client partition 604 to start the VF removal process (step 1310). The client partition 604 may receive this request and stop using the VF 613 as directed (step 1312).

The client partition 604 may signal the hypervisor 625 to remove the VF 613 from the partition's use via the "remove" function of the add/remove VF from LPAR use call 720, for example (step 1314). The hypervisor 625 may then remove the associated VF 613 resources from the client partition 604 (step 1316). The hypervisor 625 may report the VF removal to the HMC 609 (step 1318). The HMC 609 may inform the user of the completion of the operation (step 1320) and the operation terminates.

In addition to dynamically adding and removing I/O adapters or endpoints, and being able to shift VFs and their associated resources among LPARs, in a virtualized system it is useful for robustness of error handling to be able to recover from errors. The illustrative embodiments provide a mechanism for being able to recover from errors by retrieving error information, logging the error information, resetting and configuring the VFs, and then attempting to restart outstanding I/O operations. This operation is outlined in FIG. 14 as described hereafter.

Figure 14:
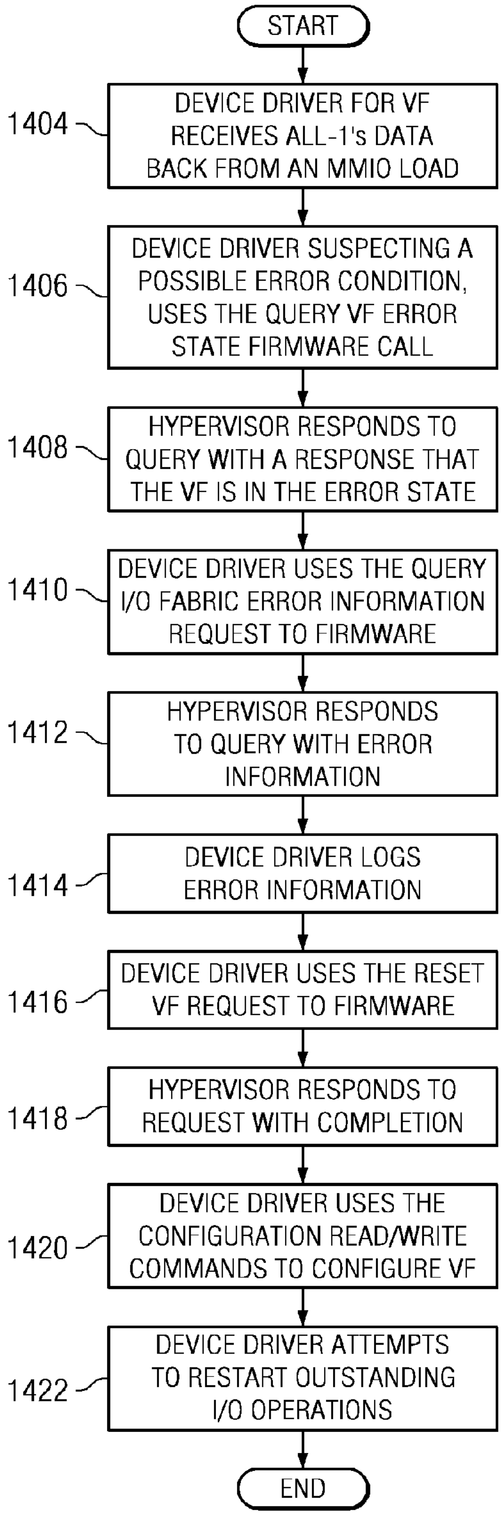
FIG. 14 is a flowchart outlining an exemplary operation for error recovery from an error incurred by a VF in accordance with one illustrative embodiment.

FIG. 14 is a flowchart outlining an exemplary operation for error recovery from an error incurred by a VF in accordance with one illustrative embodiment. The operation outlined in FIG. 14 uses an existing technique of stopping all DMA and MMIO to a VF until the device driver can recognize that there was an error, and can gracefully recover. However, the operation of FIG. 14 utilizes the mechanisms of the illustrative embodiments to augment this existing technique to control the error recovery process for VFs.

As shown in FIG. 14, the VF error recovery operation 1400 starts after an error has occurred which has put the VF into a MMIO Stopped State and DMA Stopped State. In this state, no DMA operations from the VF will be completed, MMIO Store operations will be discarded while in the MMIO Stopped State, and MMIO Load operations will get all-1's data returned. The process of error recovery starts with the device driver, e.g., device driver 606, receiving all-1's data back from an MMIO Load operation (step 1404). The device driver 606, not expecting (or not sure if it should expect) all-1's data back, uses the Query VF error state firmware call 710, for example, for the VF 613 to get the VF state information (step 1406). Since the VF 613 is in the error state at this point, the hypervisor 625 may respond to the query that the VF 613 is in the MMIO Stopped and DMA Stopped error state (step 1408). The device driver 606 may use the Query I/O fabric error information firmware call 714, for example, to obtain information about the error registers in the I/O fabric 611, for later problem determination (step 1410). The hypervisor 625 may respond to the query with the error information (step 1412) and the device driver 606 may log the information into an error log for later analysis (step 1414).

The device driver 606 may now be ready to reset its VF and try to restart operations. The device driver 606 may use the reset VF firmware request 708, for example, to reset the VF 613 (step 1416) and the hypervisor 625 may respond to the request with a completion response (step 1418). The device driver 606 may then use the read/write I/O configuration space call 702, for example, to configure its VF 613 (step 1420). The device driver 606 attempts to restart outstanding I/O operations (step 1422) and the operation terminates.

Figure 15:
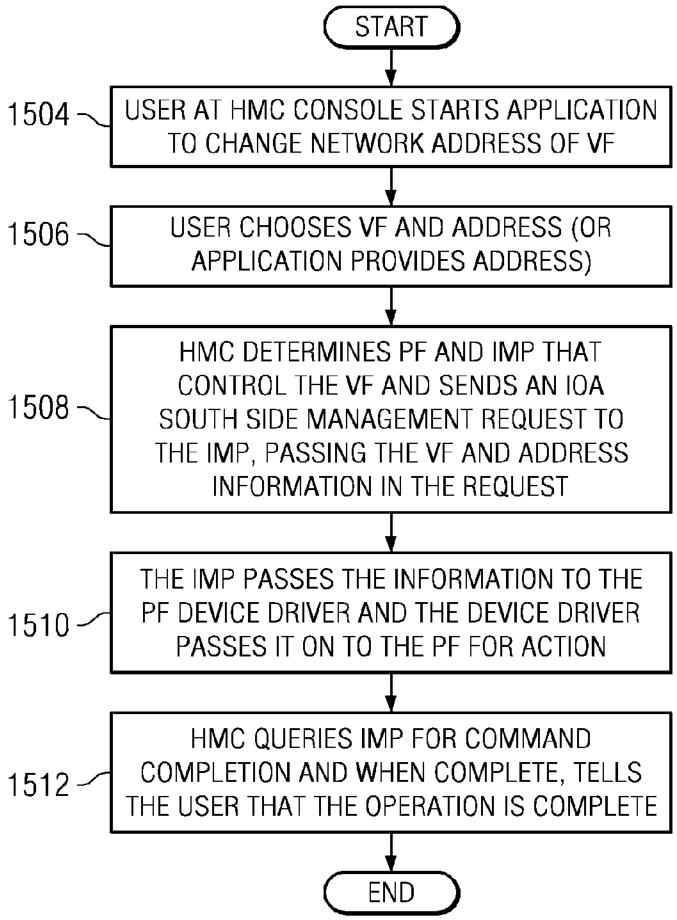
FIG. 15 is a flowchart outlining an exemplary IOA south-side management operation for changing a network address on a network adapter in accordance with one illustrative embodiment.

As previously mentioned, an important function of the IMP 603 is to provide secure access to resources of the IOA or endpoint that are either shared across the multiple LPARs that are using the VFs associated with a PF, or are unique to a VF, but which should not be accessible for change by the PF. One example of such a resource of a network I/O adapter (IOA) or endpoint is the network address associated with a PF which is shared by the VFs, or a network address that is unique to a VF. Management of these device-specific resources is referred to as IOA "south side" management of the I/O adapter or endpoint. FIG. 15 is a flowchart outlining an exemplary IOA south-side management operation for changing a network address on a network adapter in accordance with one illustrative embodiment. It should be appreciated that while FIG. 15 is specifically directed to changing a network address on a network adapter, a similar operation may be performed for other resources shared across multiple LPARs that are using the VFs associated with a PF or are unique to a VF.

As shown in FIG. 15, the operation starts with the user at the HMC console 609 starting an application to change the network address for a VF 613 (step 1504). The user may choose the VF 613 and address (or the application may provide the address based on the context of the operation) (step 1506). The HMC 609 may determine the PF 612 and IMP 603 that controls the VF 613 and may send an IOA south side management request 820 to the IMP 603, passing the VF 613 and address information in the IOA south side management request 820 (step 1508). The IMP 603 may pass the information to the PF device driver 605 and the PF device driver 605 may pass it on to the PF 612 for processing (step 1510). The HMC 609 may query the IMP 603 for command completion and when complete, may inform the user that the operation is complete (step 1512) and the operation terminates.

Figure 16:
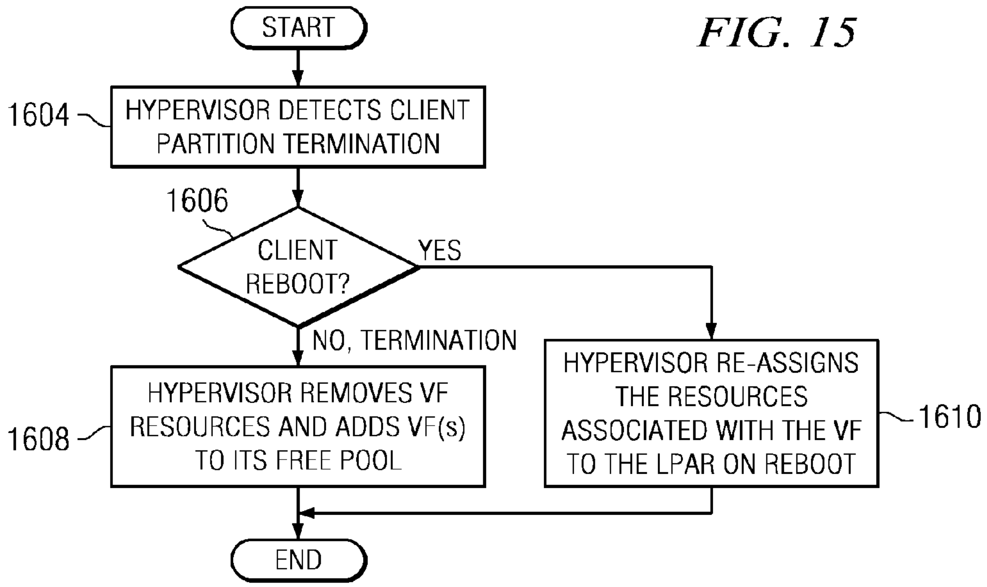
FIG. 16 is a flowchart outlining an exemplary operation for client partition termination in accordance with one illustrative embodiment.

It should be appreciated that the client partitions 604 in the system 601 may terminate operation while the system 601 is operational. There may be many different reasons why a client partition 604 may terminate, such as a non-recoverable error in the software in the client partition or a non-recoverable hardware error that affects only the partition to which that hardware is assigned. FIG. 16 is a flowchart outlining an exemplary operation for client partition termination in accordance with one illustrative embodiment. The operation 1600 outlined in FIG. 16 is directed to a case where the client partition terminates and either reboots or permanently terminates.

As shown in FIG. 16, the operation starts when a client partition 604 terminates for some reason. The hypervisor 625, which can detect when a client partition terminates, for example from a panic call from the partition to the hypervisor due to a non-recoverable software error, or due to a machine check interrupt from the hardware on a non-recoverable hardware error, may detect that the client partition 604 has terminated (step 1604). The hypervisor 625 may then determine if the client partition 604 is set for reboot or not (step 1606), for example as determined from the user's reboot policy set as part of initially setting up the partition.

If the client partition 604 is not set for reboot, the hypervisor 625 may remove the VF resources and add the VF(s) from the terminated partition to the hypervisor VF free pool (step 1608). The fact that it is a termination means that the failing client partition 604 is not going to be rebooted anytime soon and thus, the operation terminates.

If the determination is made that the client partition 604 is to be rebooted (step 1606), then the hypervisor 625 re-assigns the resources associated with the VF(s) in the partition that terminated to the corresponding partition as it is re-booted (step 1610). The operation then terminates.

Figure 17:
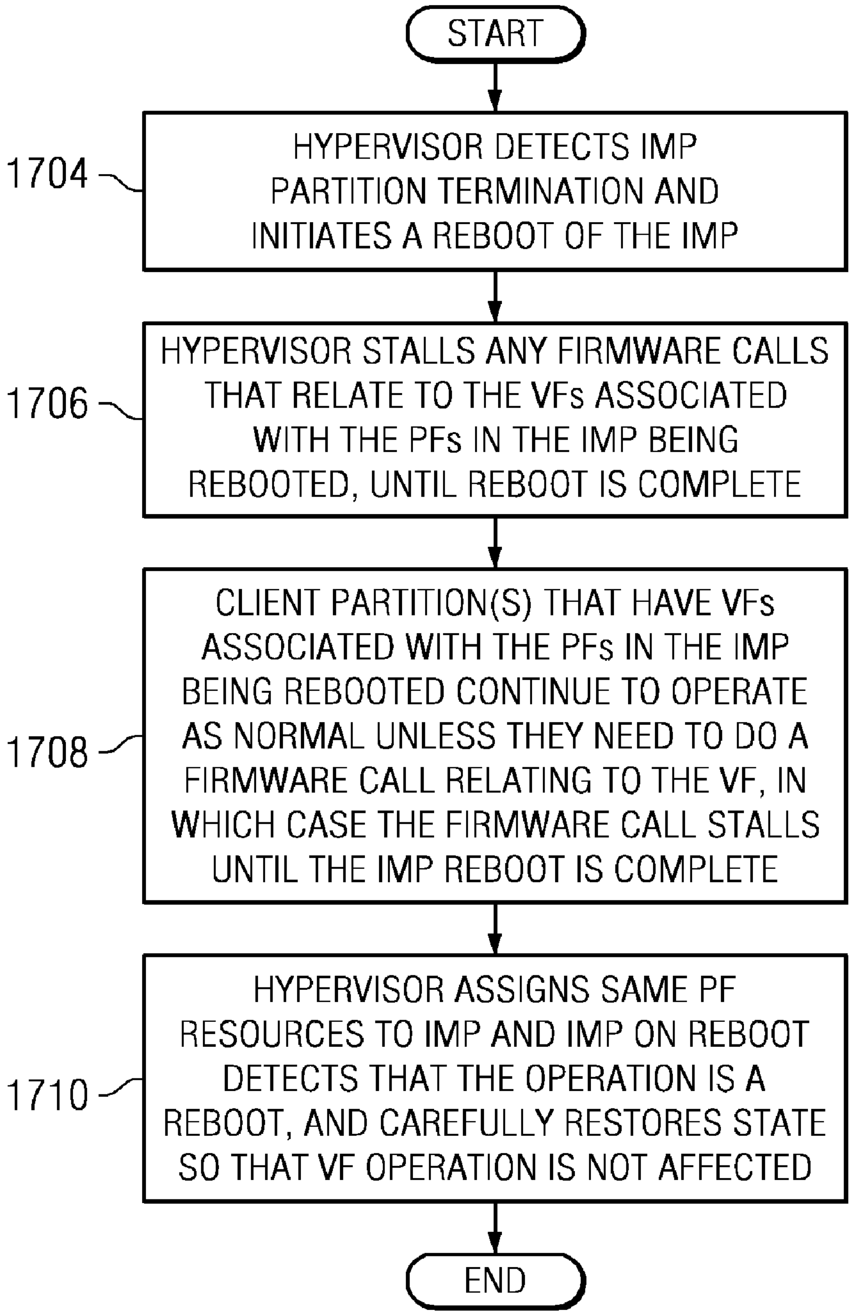
FIG. 17 is a flowchart outlining an exemplary operation for IMP partition termination in accordance with one illustrative embodiment.

It should be appreciated that during operation of the system 601, it is also possible that the IMP 603 may fail. It is expected that the IMP 603 will always be set to reboot if it fails because it is acting as a controller for resources for potentially many VFs 813 in many client partitions 604. FIG. 17 is a flowchart outlining an exemplary operation 1700 for IMP partition termination in accordance with one illustrative embodiment. As shown in FIG. 17, the operation 1700 starts with the IMP partition terminating. The hypervisor 625 may detect the IMP 603 partition termination, for example from a panic call from the partition to the hypervisor due to a non-recoverable software error, or due to a machine check interrupt from the hardware on a non-recoverable hardware error, and initiates a reboot of the IMP 603 (step 1704).

The hypervisor 625 may stall any and all firmware calls 700 for all VF(s) associated with the PF(s) in the IMP 603 being rebooted until the reboot is complete (step 1706) except that the Query interrupt Source firmware call 716 and Setup DMA translation firmware call 718 are not stalled so that normal operations can continue. The client partitions 604 that have VF(s) associated with the PF(s) in the IMP 603 being rebooted continue to operate as normal unless they need to do a firmware call which stalls, in which case the hypervisor 625 stalls the firmware call until the IMP reboot is complete (step 1708). The hypervisor 625 assigns the same PF resources to the IMP 603 and the IMP 603 on reboot detects that the operation is a reboot, and carefully restores state so that VF operations are not affected (step 1710). The operation then terminates.

Thus, the illustrative embodiments provide mechanisms that allow the management software for the south-side adapter specific management to be performed in a separate management partition, rather than in the hypervisor, while the adapter-independent operations like configuration and error management are performed by the hypervisor. It is desirable to keep I/O adapter dependent code out of the hypervisor to prevent performance impacts to the hypervisor. Moreover, it is desirable to put I/O adapter dependent code in a separate management partition so as to minimize any instability of the hypervisor code due to frequent updates, for example, due to the necessity of updating the code for different adapter-unique south-side management software. Thus, the mechanisms of the illustrative embodiments provide a much more efficient operation of the hypervisor while minimizing instability.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-recordable medium providing program code for use by or in connection with a computer or any instruction execution system. For the purposes of this description, a computer-usable or computer-recordable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device), for example. Examples of a computer-recordable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for managing input/output (I/O) virtualization, comprising:

creating one or more client partitions in the data processing system, each client partition having an associated portion of resources of the data processing system;

performing I/O virtualization management operations with an I/O endpoint associated with the data processing system, wherein the I/O virtualization management operations operate to configure at least one of a physical function or a virtual function of the I/O endpoint;

creating an I/O virtualization management partition (IMP) in the data processing system, wherein the IMP performs a subset of the I/O virtualization management operations with the I/O endpoint to thereby manage a set of physical functions, comprising one or more physical functions of the I/O endpoint, and wherein the one or more client partitions are not permitted to perform I/O virtualization management operations on the set of physical functions but are permitted to perform I/O virtualization management operations on the client partitions' associated virtual functions in the I/O endpoint; and controlling access of the I/O virtualization management operations to resources of the I/O endpoint using a virtual intermediary separate from the I/O virtualization management partition (IMP), wherein the virtual intermediary prevents a client partition from accessing resources of the I/O endpoint that are not assigned to that client partition.

2. The method of claim 1, wherein creating one or more client partitions and creating the IMP are performed by the virtual intermediary, and wherein the virtual intermediary is a hypervisor associated with the data processing system.

3. The method of claim 2, wherein the hypervisor is provided with access to configuration spaces for one or more physical functions and virtual functions in the I/O endpoint, and wherein the IMP is provided with access to only configuration spaces for the one or more physical functions assigned to the IMP and configuration spaces for virtual functions belonging to physical functions assigned to the IMP, in the I/O endpoint.

4. The method of claim 3, wherein the hypervisor permits access by a client partition to configuration spaces of virtual functions, in the I/O endpoint, assigned to the client partition and blocks access by the client partition to configuration spaces of virtual functions, in the I/O endpoint, that are not assigned to the client partition.

5. The method of claim 1, further comprising receiving an input from a hardware management console (HMC) directing performance of the I/O virtualization management operations.

6. The method of claim 5, wherein the input from the HMC is a command to initiate a hot-plug operation for adding a new I/O endpoint to the data processing system, and wherein performing the I/O virtualization management operations comprises:

allocating resources to the one or more client partitions based on addition of the new I/O endpoint;

configuring the IMP based on the addition of the new I/O endpoint; and dynamically adding at least one virtual function of the new I/O endpoint to at least one client partition in the one or more client partitions.

7. The method of claim 5, wherein the input from the HMC is a command to initiate a hot-plug operation for removing an existing I/O endpoint from the data processing system, and wherein performing the I/O virtualization management operations comprises:

identifying at least one client partition in the one or more client partitions having resources associated with a virtual function of the I/O endpoint to be removed;

removing the virtual function and resources associated with the virtual function from use by the at least one client partition;

removing, from use by the IMP, a physical function, of the I/O endpoint to be removed, and resources associated with the physical function; and powering down the I/O endpoint to be removed.

8. The method of claim 5, wherein the input from the HMC is a command to dynamically reconfigure the data processing system, and wherein performing the I/O virtualization management operations comprises:

receiving a selection of a virtual function of an I/O endpoint to add to a selected client partition in the one or more client partitions;

setting up resources for selected virtual function in the selected client partition; and loading a device driver for the selected virtual function in the selected client partition.

9. The method of claim 5, wherein the input from the HMC is a command to dynamically reconfigure the data processing system, and wherein performing the I/O virtualization management operations comprises:

receiving a selection of a virtual function of an I/O endpoint to remove from a selected client partition in the one or more client partitions;

removing the selected virtual function from further use by the selected client partition; and removing resources for selected virtual function in the selected client partition.

10. The method of claim 5, wherein the input from the HMC is a command to change a network address associated with a selected virtual function of an I/O endpoint, and wherein performing the I/O virtualization management operations comprises:

identifying a physical function associated with the selected virtual function;

sending a management request to the IMP, wherein the management request includes address information for changing the network address of the selected virtual function; and changing the network address of the selected virtual function via a device driver associated with the physical function based on the address information in the management request.

11. The method of claim 1, wherein performing the I/O virtualization management operations comprises:

receiving in the virtual intermediary, from a device driver in a client partition of the one or more client partitions, a query virtual function error state firmware call;

providing error information to the device driver from the virtual intermediary identifying an error state of a virtual function of an I/O endpoint;

logging, by the device driver, the error information received from the virtual intermediary;

sending a reset virtual function request from the device driver to firmware of the data processing system to reset the virtual function having the error state; and configuring the virtual function after reset.

12. The method of claim 1, wherein performing the I/O virtualization management operations comprises:

detecting, by the virtual intermediary, a client partition failure;

determining if a client partition reboot operation is to be performed;

if the client partition is not to be rebooted, removing virtual function resources associated with a failed client partition from the I/O endpoint and adding the removed virtual function resources to a free virtual function resource pool; and if the client partition is to be rebooted, reassigning, by the virtual intermediary, the virtual function resources to the failed client partition after reboot of the failed client partition.

13. The method of claim 1, wherein performing the I/O virtualization management operations comprises:

detecting a failure of the IMP;

initiating, by the virtual intermediary, a reboot of the IMP;

stalling firmware calls by the one or more client partitions relating to virtual functions associated with physical functions assigned to the IMP until the reboot of the IMP is complete; and discontinuing stalling of firmware calls by the one or more client partitions following completion of the reboot of the IMP.

14. A data processing system, comprising:

a processor; and a memory coupled to the processor, wherein the memory comprises instructions which, when executed by the processor, cause the processor to:

create one or more client partitions in the data processing system, each client partition having an associated portion of resources of the data processing system;

perform I/O virtualization management operations with I/O endpoint associated with the data processing system, wherein the I/O virtualization management operations operate to configure at least one of a physical function or a virtual function of the I/O endpoint;

create an I/O virtualization management partition (IMP) in the data processing system, wherein the IMP performs a subset of the I/O virtualization management operations with the I/O endpoint to thereby manage a set of physical functions, comprising one or more physical functions of the I/O endpoint, and wherein the one or more client partitions are not permitted to perform I/O virtualization management operations on the set of physical functions but are permitted to perform I/O virtualization management operations on the client partitions' associated virtual functions in the I/O endpoint, and control access of the I/O virtualization management operations to resources of the I/O endpoint using a virtual intermediary separate from the IMP, wherein the virtual intermediary prevents a client partition from accessing resources of the I/O endpoint that are not assigned to that client partition.

15. The system of claim 14, wherein creating one or more client partitions and creating the IMP are performed by the virtual intermediary, and wherein the virtual intermediary is a hypervisor associated with the data processing system.

16. The system of claim 15, wherein the hypervisor is provided with access to configuration spaces for one or more physical functions and virtual functions in the I/O endpoint, and wherein the IMP is provided with access to only configuration spaces for the one or more physical functions assigned to the IMP and configuration spaces for virtual functions belonging to physical functions assigned to the IMP, in the I/O endpoint.

17. The system of claim 16, wherein the hypervisor permits access by a client partition to configuration spaces of virtual functions, in the I/O endpoint, assigned to the client partition and blocks access by the client partition to configuration spaces of virtual functions, in the I/O endpoint, that are not assigned to the client partition.

18. The system of claim 14, wherein the instructions further cause the processor to receive an input from a hardware management console (HMC) directing performance of the I/O virtualization management operations.

19. The system of claim 18, wherein the input from the HMC is a command to initiate a hot-plug operation for adding a new I/O endpoint to the data processing system, and wherein the instructions cause the processor to perform the I/O virtualization management operations by:

allocating resources to the one or more client partitions based on addition of the new I/O endpoint;

configuring the IMP based on the addition of the new I/O endpoint; and dynamically adding at least one virtual function of the new I/O endpoint to at least one client partition in the one or more client partitions.

20. The system of claim 14, wherein the instructions cause the processor to perform the I/O virtualization management operations by:

receiving in the virtual intermediary, from a device driver in a client partition of the one or more client partitions, a query virtual function error state firmware call;

providing error information to the device driver from the virtual intermediary identifying an error state of a virtual function of an I/O endpoint;

logging, by the device driver, the error information received from the virtual intermediary;

sending a reset virtual function request from the device driver to firmware of the data processing system to reset the virtual function having the error state; and configuring the virtual function after reset.

21. The system of claim 14, wherein the instructions cause the processor to perform the I/O virtualization management operations by:

detecting, by the virtual intermediary, a client partition failure;

determining if a client partition reboot operation is to be performed;

if the client partition is not to be rebooted, removing virtual function resources associated with a failed client partition from the I/O endpoint and adding the removed virtual function resources to a free virtual function resource pool; and if the client partition is to be rebooted, reassigning, by the virtual intermediary, the virtual function resources to the failed client partition after reboot of the failed client partition.

22. The system of claim 14, wherein the instructions cause the processor to perform the I/O virtualization management operations by:

detecting a failure of the IMP;

initiating, by the virtual intermediary, a reboot of the IMP;

stalling firmware calls by the one or more client partitions relating to virtual functions associated with physical functions assigned to the IMP until the reboot of the IMP is complete; and discontinuing stalling of firmware calls by the one or more client partitions following completion of the reboot of the IMP.

23. A computer program product comprising a computer readable storage medium having a computer readable program stored thereon, wherein the computer readable program, when executed in a data processing system, causes the data processing system to:

create one or more client partitions in the data processing system, each client partition having an associated portion of resources of the data processing system;

perform I/O virtualization management operations with an I/O endpoint associated with the data processing system, wherein the I/O virtualization management operations operate to configure at least one of a physical function or a virtual function of the I/O endpoint;

create an I/O virtualization management partition (IMP) in the data processing system, wherein the IMP performs a subset of the I/O virtualization management operations with the I/O endpoint to thereby manage a set of physical functions, comprising one or more physical functions of the I/O endpoint, and wherein the one or more client partitions are not permitted to perform I/O virtualization management operations on the set of physical functions but are permitted to perform I/O virtualization management operations on the client partitions' associated virtual functions in the I/O endpoint; and control access of the I/O virtualization management operations to resources of the I/O endpoint using a virtual intermediary separate from the IMP, wherein the virtual intermediary prevents a client partition from accessing resources of the I/O endpoint that are not assigned to that client partition.

* * * * *